United States Patent
Izatt et al.

(10) Patent No.: US 12,546,582 B2
(45) Date of Patent: Feb. 10, 2026

(54) RAPID COHERENT SYNTHETIC WAVELENGTH INTERFEROMETRIC ABSOLUTE DISTANCE MEASUREMENT

(71) Applicant: DUKE UNIVERSITY, Durham, NC (US)

(72) Inventors: Joseph A. Izatt, Durham, NC (US); Al-Hafeez Z. Dhalla, Durham, NC (US); Jingkai Zhang, Durham, NC (US)

(73) Assignee: DUKE UNIVERSITY, Durham, NC (US)

( * ) Notice: Subject to any disclaimer, the term of this patent is extended or adjusted under 35 U.S.C. 154(b) by 230 days.

(21) Appl. No.: 18/573,123

(22) PCT Filed: Jun. 22, 2022

(86) PCT No.: PCT/US2022/034597
§ 371 (c)(1),
(2) Date: Dec. 21, 2023

(87) PCT Pub. No.: WO2022/271874
PCT Pub. Date: Dec. 29, 2022

(65) Prior Publication Data
US 2024/0219167 A1   Jul. 4, 2024

Related U.S. Application Data

(60) Provisional application No. 63/213,413, filed on Jun. 22, 2021.

(51) Int. Cl.
*G01B 9/02001* (2022.01)
*G01B 9/02* (2022.01)
(Continued)

(52) U.S. Cl.
CPC ..... *G01B 9/02007* (2013.01); *G01B 9/02005* (2013.01); *G01B 9/02081* (2013.01);
(Continued)

(58) Field of Classification Search
CPC ............ G01B 9/02007; G01B 9/02005; G01B 9/02081; G01B 9/02087; G01B 2290/70; G01S 17/36
See application file for complete search history.

(56) References Cited

U.S. PATENT DOCUMENTS 5,404,221 A * 4/1995 de Groot ............ G01B 9/02007
356/486
8,558,993 B2 * 10/2013 Newbury ................ G01S 7/484
356/4.1
(Continued)

FOREIGN PATENT DOCUMENTS

CN     103630086 A     3/2014
KR     102259887 B1    5/2021

OTHER PUBLICATIONS

Gupta, Abhishek, et al., "Deep Learning for Object Detection and Scene Perception in Self-Driving Cars: Survey, Challenges, and Open Issues," Array, Jul. 2021 (accessible Feb. 23, 2021), 20 pages, vol. 10, article 100057.
(Continued)

*Primary Examiner* — Jonathan M Hansen
(74) *Attorney, Agent, or Firm* — Talem IP Law, LLP

(57) ABSTRACT

A method of rapid coherent synthetic wavelength interferometric absolute distance measurement includes receiving, from an optical system, an image from an object scene of at least two distinct wavelengths of light, each wavelength's light source having a coherence length greater than a desired ambiguity length of the absolute distance measurement, and whose synthetic wavelength in combination provides the desired ambiguity length of the absolute distance measure-
(Continued)

ment. A phase-based approach, a magnitude-based approach, or an envelope of the magnitude-based approach can be taken to determine an interference between light returning from the object scene and light traversing a separate reference arm path of the optical system and calculate an optical distance to an object in the object scene.

20 Claims, 16 Drawing Sheets

(51) Int. Cl.
  *G01B 9/02002* (2022.01)
  *G01B 9/02055* (2022.01)
  *G01S 17/36* (2006.01)
(52) U.S. Cl.
  CPC .......... *G01B 9/02087* (2013.01); *G01S 17/36* (2013.01); *G01B 2290/70* (2013.01)

(56) References Cited

U.S. PATENT DOCUMENTS

| | | | |
|---|---|---|---|
| 9,575,182 | B2 | 2/2017 | Satyan et al. |
| 10,928,182 | B2 | 2/2021 | Roos et al. |
| 2010/0046003 | A1* | 2/2010 | Le Floch .............. H01S 5/4068 |
| | | | 356/486 |
| 2019/0170500 | A1 | 6/2019 | Roos et al. |
| 2020/0241139 | A1 | 7/2020 | Roos et al. |
| 2022/0316855 | A1* | 10/2022 | Heckl ..................... G01S 17/34 |

OTHER PUBLICATIONS

International Search Report and Written Opinion Issued in International Application No. PCT/US22/34597, mailed Oct. 28, 2022, 7 pages.

Guanhao Wu et al. "Synthetic wavelength interferometry of an optical frequency comb for absolute distance measurement" Scientific Reports, Nature, Mar. 12, 2018, Retrieved on: Sep. 6, 2022, 7 pages, vol. 8, Article No. 4362, Retrieved from: https://www.nature.com/articles/s41598-018-22838-0.

Khaled Alzahrani et al. "Absolute distance measurement with micrometer accuracy using a Michelson interferometer and the iterative synthetic wavelength principle" Optics Express, Feb. 23, 2012, Retrieved on: Sep. 6, 2022, pp. 5658-5682, vol. 20, issue 5, Retrieved from: https://opg.optica.org/oe/fulltext.cfm?url=oe-20-5-5658&id=227960.

* cited by examiner

RAPID COHERENT SYNTHETIC WAVELENGTH INTERFEROMETRIC ABSOLUTE DISTANCE MEASUREMENT

CROSS-REFERENCE TO RELATED APPLICATIONS

This application is the U.S. National Stage Application of International Application No. PCT/US2022/034597, filed Jun. 22, 2022, which claims the benefit of U.S. Provisional Application Ser. No. 63/213,413, filed Jun. 22, 2021, which are hereby incorporated by reference in their entirety.

BACKGROUND

There are many potential applications for rapid non-contact quantitative distance measurement/mapping in autonomous vehicles (such as self-driving cars), robotic vision, virtual/augmented reality displays, 3D scanning and printing, and biomedical applications, among many others. Previous and current generation light detection and ranging (LiDAR) systems developed for automotive sensing seek centimeter- to decimeter-scale resolution over tens to hundreds of meters range, for which pulse-echo time-of-flight imaging using direct amplified detection is sufficient and which currently dominates the landscape. Although such systems achieve near video resolution and update rate, the direct detection approach limits the detection sensitivity and dynamic range and thus makes these systems sensitive to low reflectance objects and bright ambient light.

LiDAR systems are examples of a broader class of modern 3D cameras, often denoted RGB-D (red-green-blue+depth) cameras, which typically provide video-rate room-scale imaging with centimeter-scale resolution. Multiple RGB-D camera technologies exist, including those based on triangulation from stereo imaging, structured light imaging, various forms of photogrammetry, and LiDAR (both with and without RGB information). While RGB-D cameras have become the de facto standard in 3D perception for room-scale applications such as robotic navigation, they exhibit resolution and reliability limitations that have undermined their relevance in more demanding applications, such as recognition of facial features for security or operation of robots in close proximity to humans. Whereas centimeter-scale resolution suffices for a robot navigating through an open environment (e.g., a house or factory), the smaller task space and delicacy of medical or personal care applications of robots demand higher precision solutions with millimeter-scale resolution. Thus, current RGB-D cameras are restricted to localization of large objects (such as routes to be navigated or boxes to be loaded) or gross anatomic features (such as the location of faces or limbs) which effectively excludes their use in procedures that necessarily work at much smaller scales. Furthermore, operation of current RGB-D cameras in non-ideal imaging conditions frequently yields 3D data with voids, due to occlusion, or spurious depth measurements, due to sensing limitations.

Thus, there exist a need for more effective distance measurements which have higher resolution, higher sensitivity, better immunity from optical interference, and less artifacts due to voids, occlusion, and spurious measurements leading to image noise.

BRIEF SUMMARY

Systems and methods for rapid coherent synthetic wavelength interferometric absolute distance measurement are described herein.

A method of rapid coherent synthetic wavelength interferometric absolute distance measurement includes receiving, from an optical system, an image from an object scene of at least two distinct wavelengths of light, each wavelength's light source having a coherence length greater than a desired ambiguity length of the absolute distance measurement, and whose synthetic wavelength in combination provides the desired ambiguity length of the absolute distance measurement: determining either a phase or a magnitude of an interference signal for each wavelength of light measured individually or an envelope of a magnitude of a sum of the interference signal for both wavelengths measured together, for interference between light returning from the object scene and light traversing a separate reference arm (or local oscillator) path of the optical system; and calculating an optical distance to an object in the object scene from the phase or the magnitude of the interference signal for each wavelength of light measured individually or the envelope of the magnitude of the sum of the interference signal for both wavelengths measured together, the absolute distance measurement comprising the calculated optical distance to the object.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
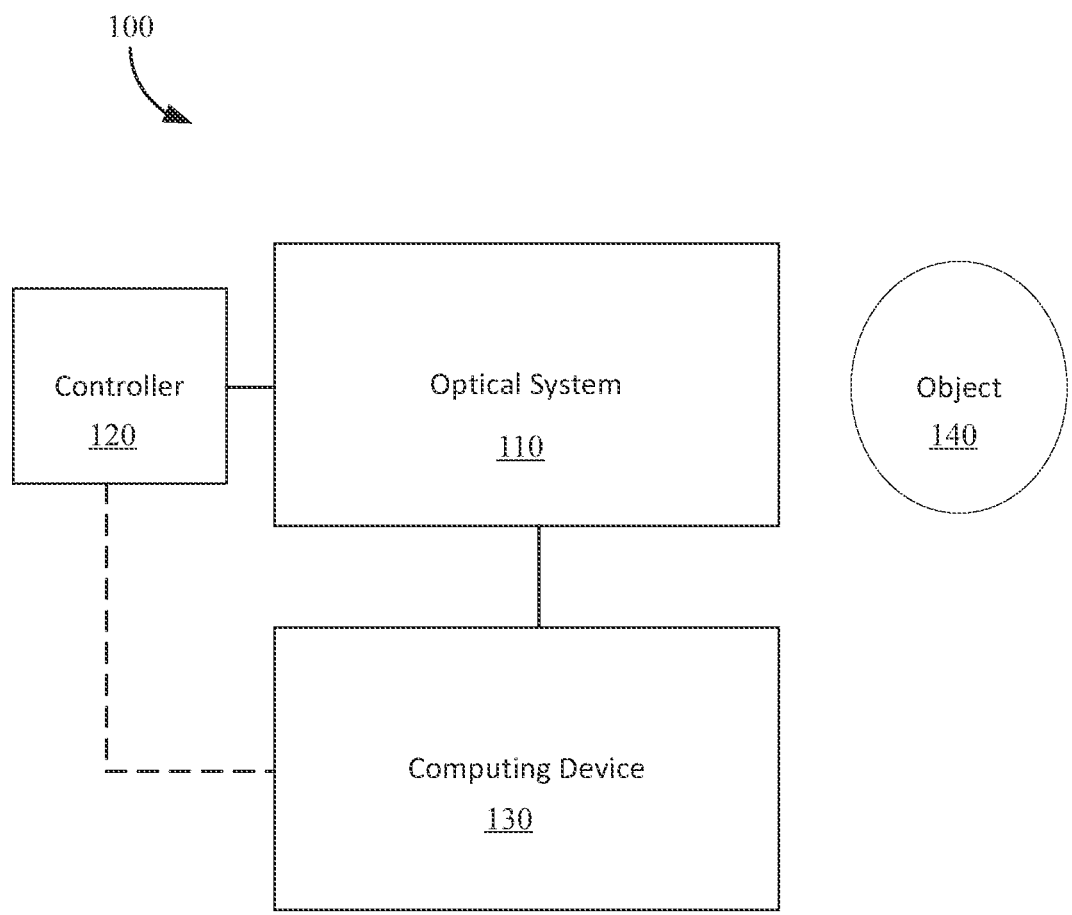
FIG. 1 illustrates a system for rapid coherent synthetic wavelength interferometric absolute distance measurement.

Systems and method for rapid coherent synthetic wavelength interferometric absolute distance measurement is described herein.

Current generation LiDAR systems developed for robotic guidance and automotive sensing primarily feature centimeter-scale resolution over tens to hundreds of meter range, for which pulse-echo time-of-flight (ToF) imaging using direct amplified detection is sufficient. In its simplest form, ToF LiDAR sends out picosecond-scale light pulses and collects the reflected pulse from the object, although amplitude-modulated continuous-wave (AMCW) versions are increasingly popular in highly parallel (emitter-detector array) implementations such as are employed in some smart phones and tablets. In either case, the distance of the object is obtained by dividing half of the measured round-trip time (or amplitude modulation phase delay in AMCW) by the speed of light in the medium. The primary limitations of ToF LiDAR are the lower limit of ~centimeter-scale resolution due to the ~100 GHz laser modulation required, and extreme sensitivity to ambient light (such as sunlight or other ToF LiDARs nearby) due to the direct detection approach. The key to increasing the resolution below ~1 centimeter is to take advantage of the much larger optical bandwidth available from tunable laser sources, coupled with coherent detection via low-coherence interferometry which also eliminates sensitivity to any other light source. The resulting technology, termed frequency-modulated continuous wave (FMCW) LiDAR, extends the axial resolution of LiDAR down to the sub-mm scale. In fact, FMCW LiDAR applies exactly the same principle as swept-source optical coherence tomography (SSOCT), a technology developed for biomedical imaging applications, the only difference being that in LiDAR only the peak of the Fourier transform of the laser chirp is saved. This is because in LiDAR the dominant reflection is assumed to arise from the target surface. Thus, LiDAR is a 3D surface imaging technology as opposed to a full volumetric tomography (such as SSOCT) as is more common in medical imaging. One important feature of the present invention is that it removes this inefficiency in current FMCW systems, wherein full depth information for every image pixel is acquired but then mostly discarded. The disclosed technology for rapid coherent synthetic wavelength interferometric absolute distance measurement obtains absolute distance measurements from a minimal number of interferometric measurements necessary to obtain the desired depth range and resolution.

Furthermore, because current-generation FMCW LiDAR systems require a full-range frequency sweep to obtain the target range for each lateral pixel, the throughput (defined as depth voxel acquisition rate) of such systems is equivalent to the laser sweep rate (or A-scan rate in OCT terminology). Due to the limited bandwidth of digitizers and the speed limitations of beam steering using mechanical scanners, previous densely sampled FMCW LiDAR systems have typically suffered from a low 3D frame rate (<1 Hz), which greatly restricts their applications in real-time imaging of dynamic scenes.

Recent work using broadband interferometry such as frequency-modulated continuous range (FMCW) LIDAR has extended the axial resolution of LIDAR down to the sub-mm scale, however full 3D surface imaging at full video resolution still requires several seconds acquisition time. A very attractive requirement for wide deployment room-scale LIDAR would be for rapid meter-scale distance mapping with millimeter-scale resolution, with near photographic lateral resolution and number of resolvable points (i.e., ~1K horizontal×~1K lateral×~1K depth pixels=1 Gvoxel) acquired and displayed at or near video rate. The resulting required ~30 Gvoxel/sec acquisition rate for full 3D voxel acquisition pushes the boundaries of current digitization technology and thus remains cost prohibitive for mass production.

However, for most envisioned applications, 3D surface imaging (rather than full tomographic 3D voxel acquisition) can be used, thus a compressive acquisition technique capable of acquiring ~1K horizontal×~1K lateral points, each with 8- to 10-bits range resolution (thus maintaining ~1K resolvable depth points) at video rate would greatly reduce the required pixel throughput rate, potentially to <<1 G Voxel/sec depending upon the achievable compression ratio.

Embodiments are disclosed for measurement of distance to the first or predominant reflection of an object at a specific lateral position in a scene (also known as ranging or 1D surface imaging), along a single lateral direction comprising a linear profile of object surfaces in a scene (2D surface imaging), or along two lateral dimensions for mapping the distance to all objects in a scene within a defined field-of-view (3D surface imaging). In this regard, the first dimension is defined as the distance or range to the first or predominant reflection of an object, the second dimension is defined as one of the two dimensions orthogonal to the first dimension, and the third dimension is defined as the other orthogonal lateral dimension.

Using systems and methods described herein, imaging can be achieved on the scale of meters (with resolution on the scale of millimeters) for room-scale applications in robotic vision, augmented reality, object identification, and security; up to tens of meters (with resolution on the scale of centimeters) for applications in construction, object localization and tracking, asset management and defense; and up to hundreds of meters (with resolution on the scale of decimeters) for applications in autonomous vehicles, among many others. The light wavelengths used for the measurement can be any for which optical components (such as lasers, beamsplitters, fiber optics, and receivers) are available, although the near-infrared regions near 1.3 or 1.5 micrometers wavelength are preferable for eye safety, and the 900-1000 nanometer region is preferable for the availability of inexpensive array detectors. In addition, the principle of operation described herein is broadly applicable to other electromagnetic radiation, even for wavelengths for which optical components are not available and other types of sources and detectors are used (e.g., radar and microwaves).

FIG. 1 illustrates a system for rapid coherent synthetic wavelength interferometric absolute distance measurement. Referring to FIG. 1, a system 100 for rapid coherent synthetic wavelength interferometric absolute distance measurement includes an optical system 110, controller 120, and computing device 130. The optical system 110 is used, under control of the controller 120, to illuminate an object 140 scene using light in a sample arm of an interferometer using at least two distinct wavelengths of light, each wavelength's light source having a coherence length greater than the desired ambiguity length of the distance measurement, and whose "synthetic wavelength" in combination provides the desired maximum ambiguity length of the distance measurement.

Synthetic wavelength interferometry involves the extension of the ambiguity length through using two separate narrow band light fields with different center wavelengths, where the wavenumber separation corresponds to the synthetic wavelength (e.g., $\Lambda_{12}$). This enables imaging on the scale of meters or even longer, while making possible resolution on the scale of millimeters or even less.

Figure 10A:
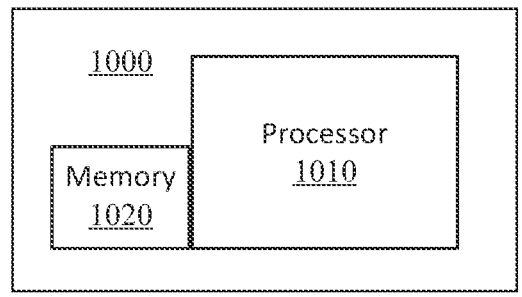
FIG. 10A illustrates components of a controller that may be used in a system for rapid coherent synthetic wavelength interferometric absolute distance measurement.

The controller 120, which may be embodied as described with respect to controller 1000 of FIG. 10A, controls operations of the optical system 110 such that appropriate signals/images can be acquired of an object 140. For example, the controller 120 can control the tuning/switching of lasers and scanning of optical scanners.

Figure 2:
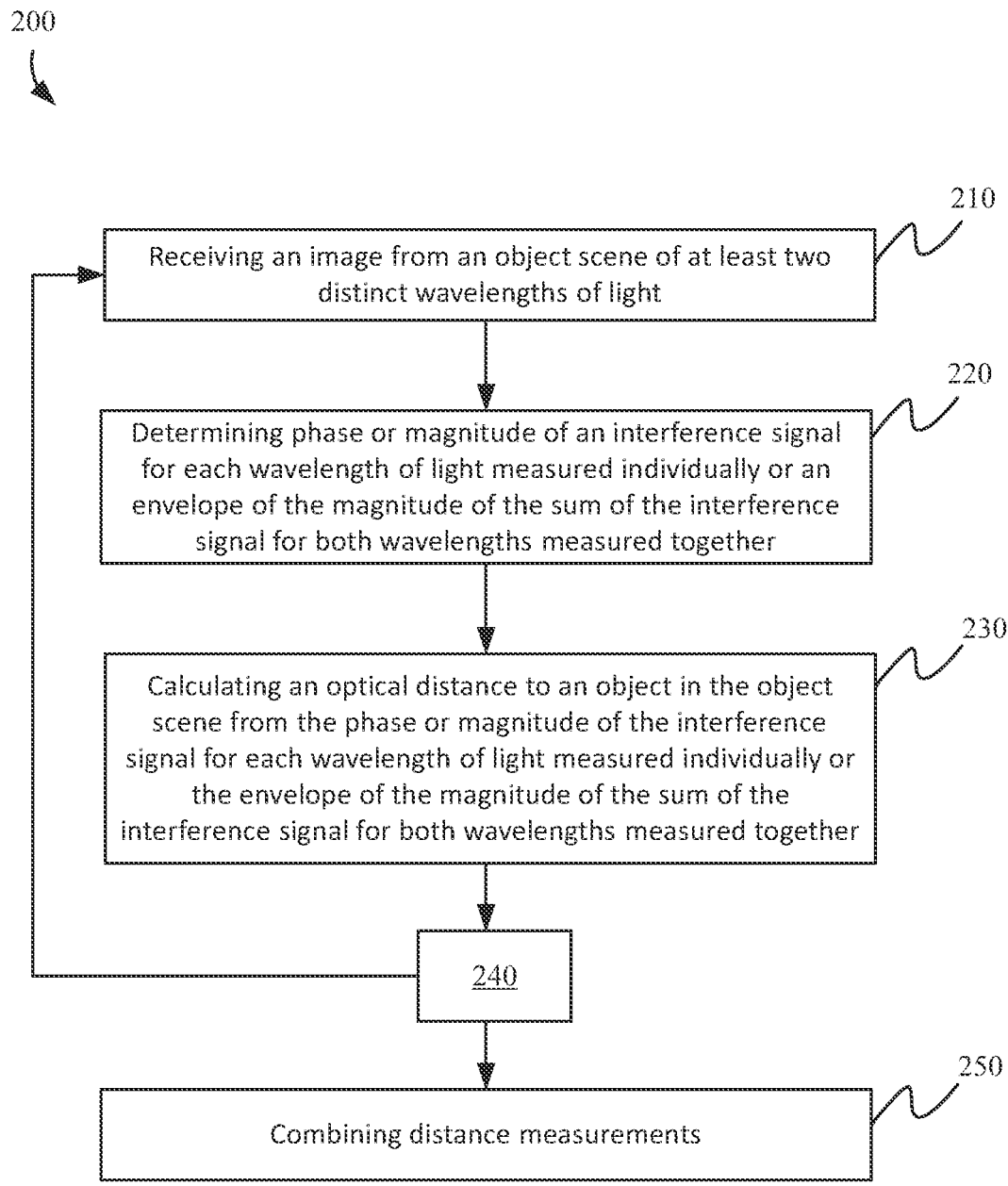
FIG. 2 illustrates a method of rapid coherent synthetic wavelength interferometric absolute distance measurement.
Figure 10B:
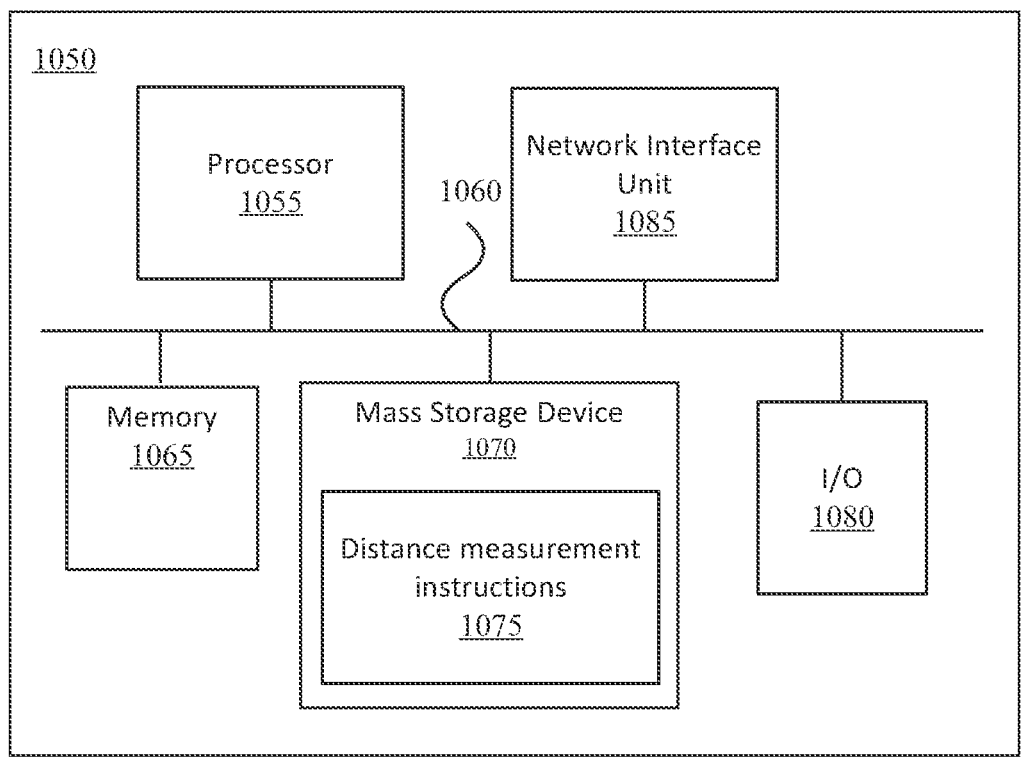
FIG. 10B illustrates components of a computing system that may be used in a system for rapid coherent synthetic wavelength interferometric absolute distance measurement.

The computing device 130, which may be embodied as described with respect to computing device 1050 of FIG. 10B, receives the acquired signals/images and performs calculations, for example, according to method 200 of FIG. 2, to obtain the distance measurement to a surface of the object 140. Computing device 130 can include or be coupled to a digitizer coupled to detectors of the optical system 110 to digitize the outputs of the detectors before performing the appropriate calculations (e.g., to compute the pathlength difference using the appropriate formulas such as described herein). In some cases, controller 120 and/or computing device 130 perform assembly and presentation of images captured by the optical system 110.

In some cases, controller 120 and computing device 130 are embodied as part of a same device for both control of the optical system 110 and evaluation of the output of the optical system 110. Therefore, while two components are shown in the Figure, a single device may be used.

System 100 can be implemented in vehicles (e.g., for autonomous vehicles) as well as for room-scale applications in robotic vision, augmented reality, object identification, and security.

FIG. 2 illustrates a method of rapid coherent synthetic wavelength interferometric absolute distance measurement. Method 200 may be performed by computing device 130 of FIG. 1. Method 200 involves receiving (210) an image from an object scene of at least two distinct wavelengths of light, each wavelength's light source having a coherence length greater than the desired ambiguity length of the distance measurement, and whose synthetic wavelength in combination provides the desired maximum ambiguity length of the distance measurement.

Method 200 further includes determining (220) either the phase or the magnitude of the interference signal for each wavelength measured individually ("phase-based approach" or "magnitude-based approach") or the envelope of the magnitude of the sum of the interference signal for both wavelengths measured together ("envelope of magnitude-based approach"), for interference between light returning from the object scene and light traversing a separate reference arm (or reference oscillator) path of known optical pathlength of an optical system (e.g., optical system 110 of FIG. 1).

The optical system can have an interferometer configuration (including bulk-optic and fiber-optic interferometers) and sample and reference arm configurations (including light collimation/focusing/polarization optics) such as described herein with respect to FIGS. 3A, 3B, 4A, 4B, 5A, 5B, 6, 7, 8, and 9B. In addition, the received signals (e.g., of the image from the object scene in operation 210) can be captured through suitable coherent detection methods, including differential and/or quadrature detection using various forms of phase stepping, phase sweeping, and/or off-axis holographic detection methods as described herein (and which can be controlled by controller 120 of FIG. 1).

Method 200 further includes calculating (230) an optical distance to an object in the object scene from the phase or the magnitude of the interference signal for each wavelength measured individually or the envelope of the magnitude of the sum of the interference signal for both wavelengths measured together. The formulas (which are described in more detail in the theoretical evaluation section) for optical distance $\Delta z$ that can be used include for a phase-based approach:

$$\Delta z = \frac{\phi_1 - \phi_2}{2\Delta k_{12}} = \frac{\tan^{-1}\left[\frac{I_1^{90} - I_1^{270}}{I_1^0 - I_1^{180}}\right] - \tan^{-1}\left[\frac{I_2^{90} - I_2^{270}}{I_2^0 - I_2^{180}}\right]}{2\Delta k_{12}},$$

$$\Delta z = \frac{\phi_1 - \phi_2}{2\Delta k_{12}} = \frac{\tan^{-1}\left[\frac{I_1^{90-180} - I_1^{270-360}}{I_1^{0-90} - I_1^{180-270}}\right] - \tan^{-1}\left[\frac{I_2^{90-180} - I_2^{270-360}}{I_2^{0-90} - I_2^{180-270}}\right]}{2\Delta k_{12}}.$$

The formulas (which are described in more detail in the theoretical evaluation section) for optical distance $\Delta z$ that can be used include for a magnitude-based (and in the third formula for the envelope of the magnitude-based) approach:

$$\Delta z = \frac{1}{\Delta k_{12}} \arccos\left[\frac{\sqrt{(I_{12}^0 - I_{12}^{180})^2 + (I_{12}^{90} - I_{12}^{270})^2}}{2 \cdot \sqrt{(I_1^0 - I_1^{180})^2 + (I_1^{90} - I_1^{270})^2}}\right],$$

-continued $$\Delta z = \frac{1}{\Delta k_{12}} \arccos \left[ \frac{\sqrt{(I_{12}^{0-90} - I_{12}^{180-270})^2 + (I_{12}^{90-180} - I_{12}^{270-360})^2}}{2 \cdot \sqrt{(I_{1}^{0-90} - I_{1}^{180-270})^2 + (I_{1}^{90-180} - I_{1}^{270-360})^2}} \right],$$

$$\Delta z = \frac{1}{\Delta k_{12}} \arccos \left[ \frac{LPF[|\tilde{I}_{12}|]}{LPF[|\tilde{I}_{1}|]} \right].$$

In some cases, method 200 further includes repeating (240) the receiving 210, detecting 220, and calculating 230 with two or more additional wavelengths whose synthetic wavelength in combination provides a higher resolution distance measurement than the previous measurement.

In some cases, method 200 further includes combining (250) the distance measurements from several combinations of synthetic wavelength to provide a high-resolution distance measurement over a long measurement range. The combining 250 can be performed using, for example, a binary successive approximation (see e.g., theoretical evaluation section).

As mentioned above, phase-based, magnitude-based, and envelope of magnitude-based approaches, optionally in combination with a binary successive approximation approach for resolution improvement and range extension, can be used to determine a distance measurement from detected signals of an optical system. Various optical systems may be used to achieve rapid coherent synthetic wavelength interferometric absolute distance measurement through these approaches, including the optical circulator-based non-quadrature detection optical systems described with respect to FIGS. 3A and 3B, the optical hybrid-based optical systems described with respect to FIGS. 4A, 4B, 5A, and 5B, the polarization encoding-based optical systems described with respect to FIGS. 6, 7, and 8, and the off-axis holographic-based optical systems described with respect to FIG. 9B.

In a broad application to other forms of electromagnetic radiation, for example, using other types of sources and detectors, an example method can include receiving, from a sensing system, data from an object scene of at least two distinct wavelengths of radiation; determining either a phase or a magnitude of an interference signal for each wavelength measured individually or an envelope of a magnitude of a sum of the interference signal for both wavelengths measured together, for interference between radiation returning from the object scene and radiation traversing a separate reference arm/local oscillator path of the sensing system; and calculating a distance to an object in the object scene from the phase or the magnitude of the interference signal for each wavelength measured individually or the envelope of the magnitude of the sum of the interference signal for both wavelengths measured together, the absolute distance measurement comprising the calculated distance to the object. The formulas presented herein can be applied in this scenario and used in the calculating steps.

Traditional methods for coherent interferometric quadrature detection for optical metrology and profilometry typically involve either stepping or sweeping the pathlength difference between reference and sample paths of the measurement interferometer, typically by multiple sequential steps of π/2 phase delay, using a piezoelectric mounted reflector or fiber stretcher or other means for differential modulation the two pathlengths. These historic methods are also applicable for quadrature detection in the present invention; however, the sequential nature of these approach increases the measurement time and optical system stability requirements so they are likely not optimal for high-speed coherent synthetic wavelength interferometric absolute distance measurement.

Figure 3A:
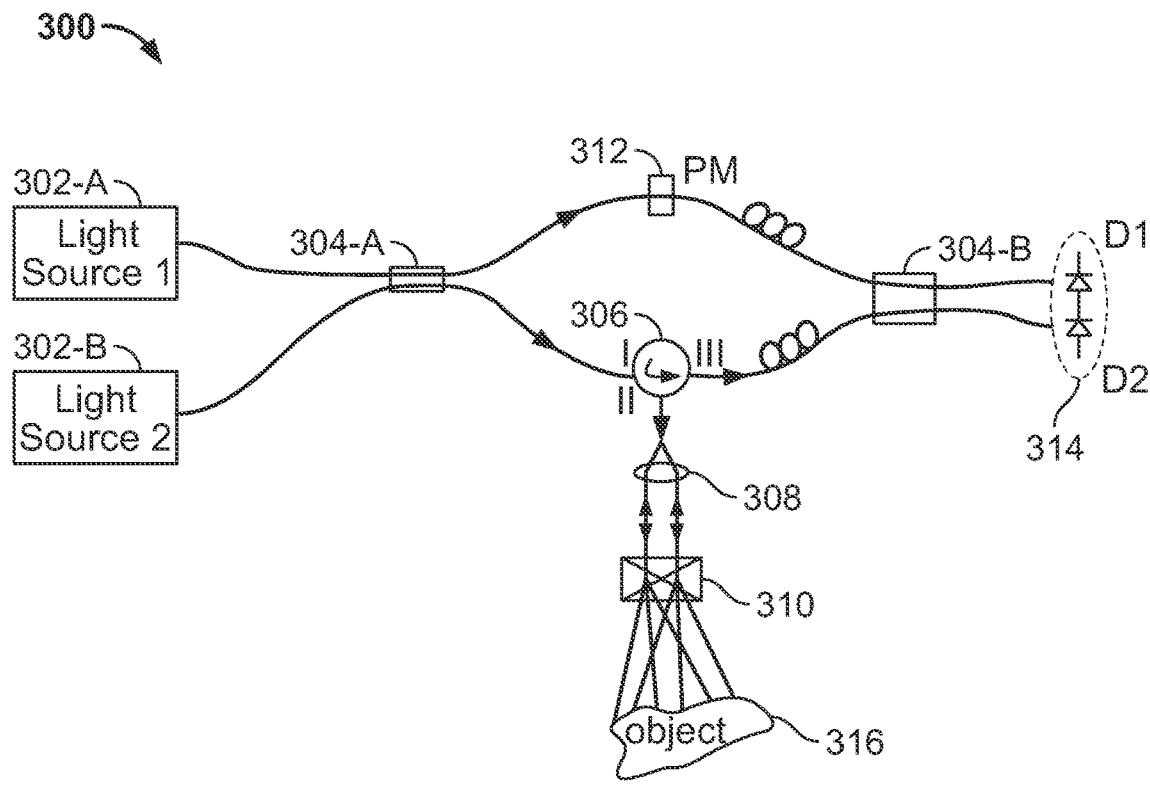
FIG. 3A illustrates a dual-wavelength, 1-D, differential detection, fiber-optic circulator configuration that may be used in a system for rapid coherent synthetic wavelength interferometric absolute distance measurement.

Alternatively, optical hybrid and polarization encoding-based optical systems are suitable for simultaneous phase-separated quadrature detection, providing for very high measurement speed. Optical hybrids based on integrated- or micro-optics technology (such as the Six-Port 90-Degree Optical Hybrid product available from OptoPlex Corporation (Fremont, California)) are available with intrinsic π/2 phase separation for instantaneous optical quadrature detection, for example, as illustrated in FIG. 3A. An attractive low-cost alternative to integrated optics optical hybrids are optical hybrids based on 3×3 (or higher port count) optical fiber splitters, which provide approximately 2π/3 phase separation between each of the output ports, which can be readily converted to π/2 phase separated real and imaginary parts using simple formulae (see Theoretical Evaluation Section).

Any of these quadrature detection technologies can be either simultaneously or sequentially at multiple wavelengths, particularly for very closely spaced wavelengths (i.e., within a few nm) such as are necessary for synthetic wavelength-based imaging with millimeter-scale resolution and meter-scale ambiguity range. As such, they can be employed for either phase- or magnitude-based detection at n wavelengths $\lambda_1 \ldots \lambda_n$, where each sequential wavelength separation increases by a factor of 2 for n-bit depth $\Delta z$, measurement. This can be done either sequentially, or at pairs of wavelengths $\lambda_1+\lambda_2$, $\lambda_1+\lambda_3$, $\lambda_1+\lambda_4 \ldots$ simultaneously for the envelope of magnitude-based approach. The sequential approach can be implemented with a single laser capable of rapid tuning to n wavelengths with such power of 2 wavelength separation (e.g., a random access laser), followed by phase-based or magnitude-based analysis using the methods described herein. Detection at the same pairs of wavelengths simultaneously, however, requires either two lasers (with the first fixed at $\lambda_1$, the second one rapidly tuned to the other (n−1) power of 2 wavelengths, and their outputs summed together), or a single laser which can output the rapidly tuned required pairs of wavelengths.

FIG. 3A illustrates a dual-wavelength, 1-D, differential detection, fiber-optic circulator configuration that may be used in a system for rapid coherent synthetic wavelength interferometric absolute distance measurement using an envelope of the magnitude approach. A system for rapid single-channel (1-D) differential detection at a single or multiple wavelengths can be implemented as optical system 300. Optical system 300 includes laser sources 302-A, 302-B at two distinct wavelengths, two 2×2 fiber couplers 304-A, 304-B, a fiber optic circulator 306, a collimating lens 308, an optical scanner 310, a transmissive reference arm optionally including a phase modulator (PM) 312, and a single balanced differential optical receiver 314. The direction of light propagating in the various arms is indicated by arrows.

Light from the dual laser sources 302-A, 302-B is combined by the first fiber coupler 304-A where it is also split into sample and reference paths. Light in the sample arm is directed into the port I of the fiber optic optical circulator 306, whereupon it is sent out port II towards the object 316. Upon exiting the port II fiber of the circulator 306, the sample light is collimated or focused (by collimating lens 308) in the neighborhood of the sample surface of the object scene and laterally scanned in 1 or 2 lateral directions by the optical scanner 310, which can be any suitable scanning mechanism such as some combination of galvanometer scanners, resonant scanners, MEMS scanners, rotating polygonal mirrors, acousto-optic scanners, or any other lateral light scanning technology.

Light reflected from the sample of the object scene 316 is focused back into the fiber leading to port II of the optical circulator 306, which directs it to port III whereupon it is combined with light transmitted through the transmissive reference arm in the second fiber coupler. Light in the reference arm is optionally modulated by a phase modulator (PM) 312 as needed for direct detection of the envelope of the magnitude of the dual-wavelength interferogram using low-pass filtering of a rectified, modulated interferometric signal as detailed in the Theoretical Evaluation section. The phase modulator 312 may be placed in either sample or reference arm (as illustrated), in fact sufficient signal modulation required for envelope detection may be derived from other sources such as unavoidable motion of the interferometer arm fibers, the sample object itself, or slight modulation of the wavelength of either laser source by, for example rapid current or temperature modulation of the source laser diode. The second fiber coupler is designed for 50/50 power splitting so that equal powers of combined light returning from the sample and reference arm are incident on the high-speed balanced differential optical receivers. With this configuration, interfering light impinging on each detector (of receiver 314) will have a phase shift of 0° (D1) and 180° (D2) between sample and reference arm optical paths, as needed for differential detection of the dual-wavelength summed interferogram $\tilde{I}_{12}$ as required for direct envelope detection of the envelope of the dual-wavelength interferogram.

Figure 3B:
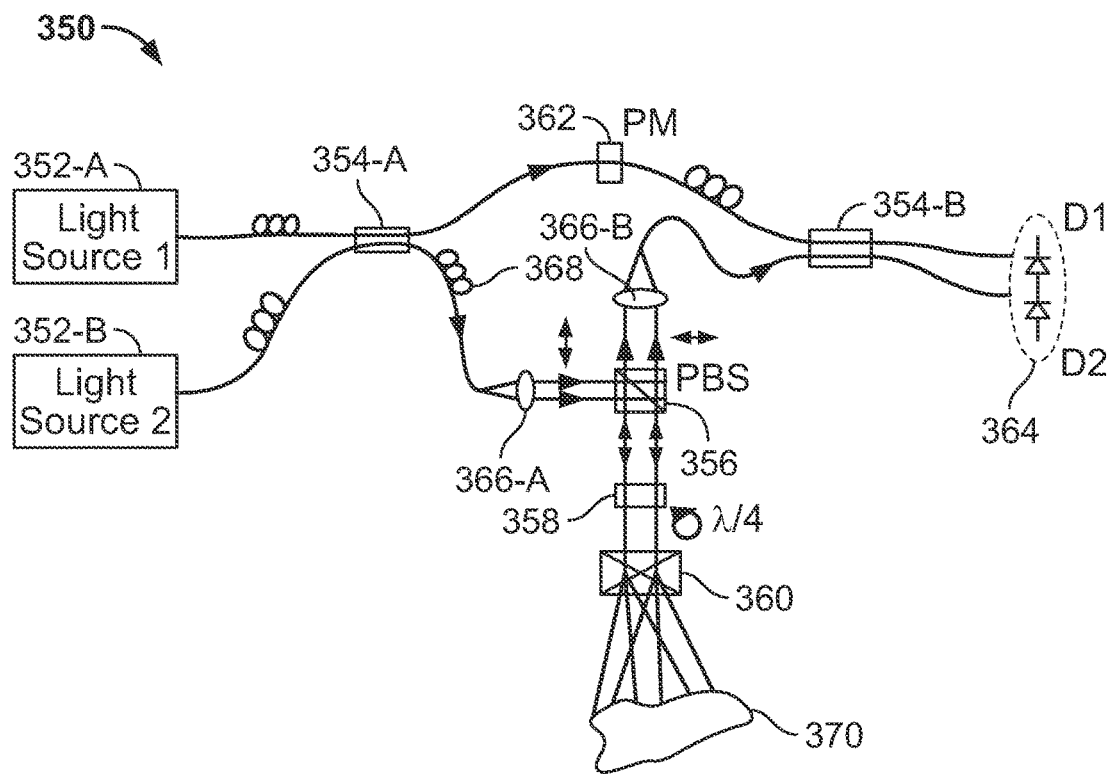
FIG. 3B illustrates a dual-wavelength, 1-D, differential detection, polarization-encoded high isolation configuration that may be used in a system for rapid coherent synthetic wavelength interferometric absolute distance measurement.

FIG. 3B illustrates a dual-wavelength. 1-D, differential detection, polarization-encoded high isolation configuration that may be used in a system for rapid coherent synthetic wavelength interferometric absolute distance measurement. Referring to FIG. 3B, optical system 350 includes laser sources 352-A, 352-B at two distinct wavelengths and two 2×2 fiber couplers 354-A, 354-B. Instead of the fiber optic circulator 306 in the optical system 300 of FIG. 3A, the optical system 350 of FIG. 3B has a directional polarization gate 356. Optical system 350 further includes a quarter wave plate 358, an optical scanner 360, a transmissive reference arm optionally including a phase modulator (PM) 362, a single balanced differential optical receiver 364, and lenses 366-A, 366-B. The direction of light propagating in the various arms is indicated by arrows.

The directional polarization gate 356 is able to perform the same optical function as the fiber optic circulator, but with better isolation performance (defined as any light which leaks from port I to port III directly within the circulator) than the fiber-optic circulator. Even if the circulator itself has excellent isolation performance, a finite reflection from the angled tip of the fiber emerging from port II of a circulator can have as much as ~-50 dB reflectivity, which creates the same effect as poor isolation and can be enough to overwhelm the light power reflected from the sample object, thus rendering homodyne detection impossible. To correct this issue, in FIG. 3B, the light emerging from the sample fiber is collimated (e.g., by lens 366-A) and incident on a polarized beamsplitter cube (PBS) 356. The polarization state in the sample fiber from each laser is adjusted using the illustrated fiber loops (e.g., loops 368) to be linearly polarized such that it will be reflected in the beamsplitter 356 toward the sample scene 370, passed through a quarter-wave plate 358 oriented at 45 degrees to the vertical, and optically scanned by the 1D or 2D scanner 360.

Figure 4A:
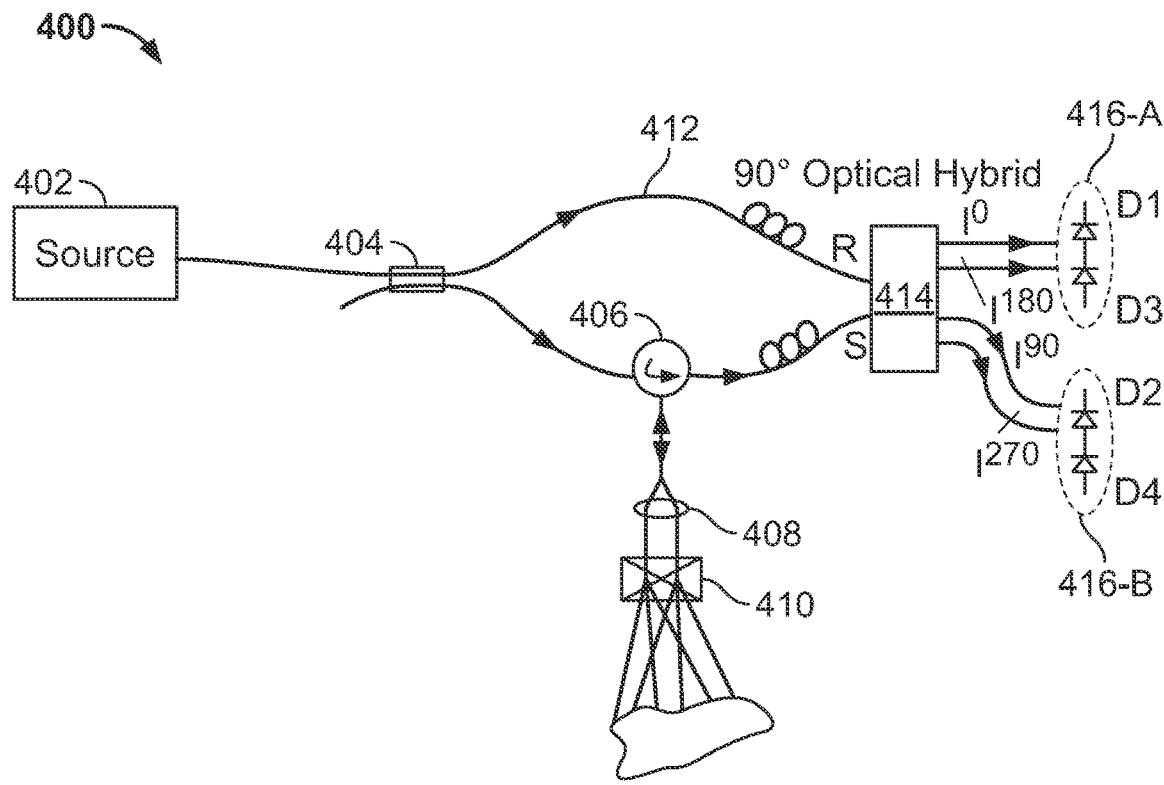
FIG. 4A illustrates a 1-D 90-degree optical hybrid, fiber-optic circulator configuration that may be used in a system for rapid coherent synthetic wavelength interferometric absolute distance measurement.

The quarter-wave plate 358 will generate circular polarization of the light incident on the object scene 370, and upon passing again through the quarter wave plate 358 on the return path, the reflected light will be linearly horizontally polarized and will thus pass through the PBS 356, re-focused into the remaining sample arm fiber, and differentially detected (see also description of FIG. 4A). This directional polarization gate thus performs the same function as the fiber optic circulator, but without any possibility of light from the light sources being collected by the latter portion of the sample arm fiber without being sent to the sample (so long as surface reflections from the PBS 356 and quarter-wave plate 358 are carefully mis-directed away from being coupled into the sample arm collection fiber. With this configuration, similar to that described with respect to FIG. 3A, interfering light impinging on each detector (of receiver 364) will have a phase shift of 0° (D1) and 180° (D2) between sample and reference arm optical paths, as needed for differential detection of the dual-wavelength summed interferogram $\tilde{I}_{12}$ as required for direct envelope detection of the envelope of the dual-wavelength interferogram.

FIG. 4A illustrates a 1-D 90-degree optical hybrid, fiber-optic circulator configuration that may be used in a system for rapid coherent synthetic wavelength interferometric absolute distance measurement. Referring to FIG. 4A, optical system 400 includes a laser source 402, a fiber coupler 404, a fiber optic circulator 406, a collimating lens 408, an optical scanner 410, a transmissive reference arm 412, a 90° optical hybrid 414, and two pairs of differential optical receivers 416-A, 416-B. The direction of light propagating in the various arms is indicated by arrows.

A difference between the configuration illustrated in FIG. 4A and polarization-gated versions described below (e.g., with respect to FIG. 6) is that the phase stepping is performed within the 6-port 90 degree optical hybrid 414, which has ports as indicated: two inputs for the reference (R) and sample (S) light, and four outputs corresponding to the same π/2 wavelength-separated outputs D1 . . . D4 as achieved with the polarization gating implementations. Thus, the output of differential D1-D3 provides $I_1^0$-$I_1^{180}$, and the output of differential receiver D2-D4 provides $I_1^{90}$-$I_1^{270}$, as required by the provided formulas for phase-stepped phase-based and magnitude-based calculation of the interferometer pathlength difference at each wavelength. An advantage of this implementation is that the 6-port circulator is a simple modular device which is used for high-density modulation schemes for high-speed optical communications networks and is likely to become ubiquitous as these networks are widely deployed (while acknowledging that the part is currently expensive).

Figure 4B:
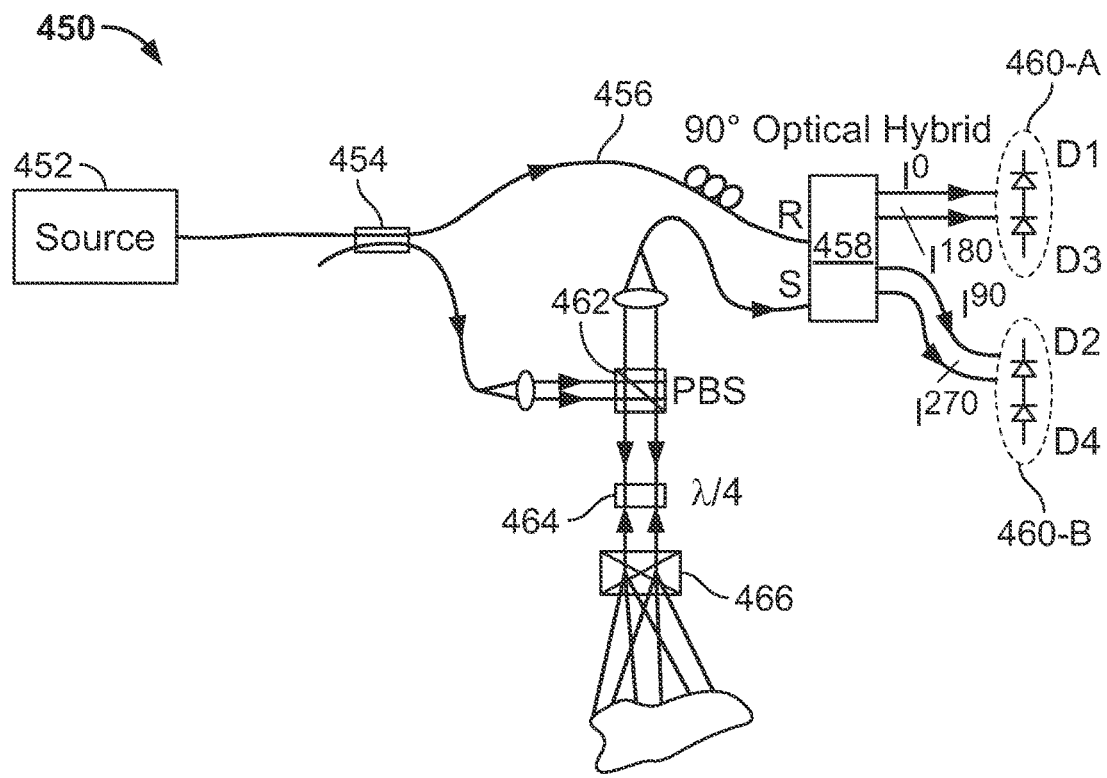
FIG. 4B illustrates a 1-D 90-degree optical hybrid, polarization-encoded high isolation configuration that may be used in a system for rapid coherent synthetic wavelength interferometric absolute distance measurement.

FIG. 4B illustrates a 1-D 90-degree optical hybrid, polarization-encoded high isolation configuration that may be used in a system for rapid coherent synthetic wavelength interferometric absolute distance measurement. Referring to FIG. 4B, optical system 450 includes a laser source 452, a coupler 454, a transmissive reference arm 456, a 90° optical hybrid 458, and two pairs of differential optical receivers 460-A, 460-B. Instead of the fiber optic circulator 406 in the optical system 400 of FIG. 4A, the optical system 450 of FIG. 4B has a directional polarization gate 462, similar to the implementation of FIG. 3B, and includes a quarter wave plate 464 and an optical scanner 466. Operation of the directional polarization gate 462 and sample arm is the same as that described with respect to FIG. 3B.

Figure 5A:
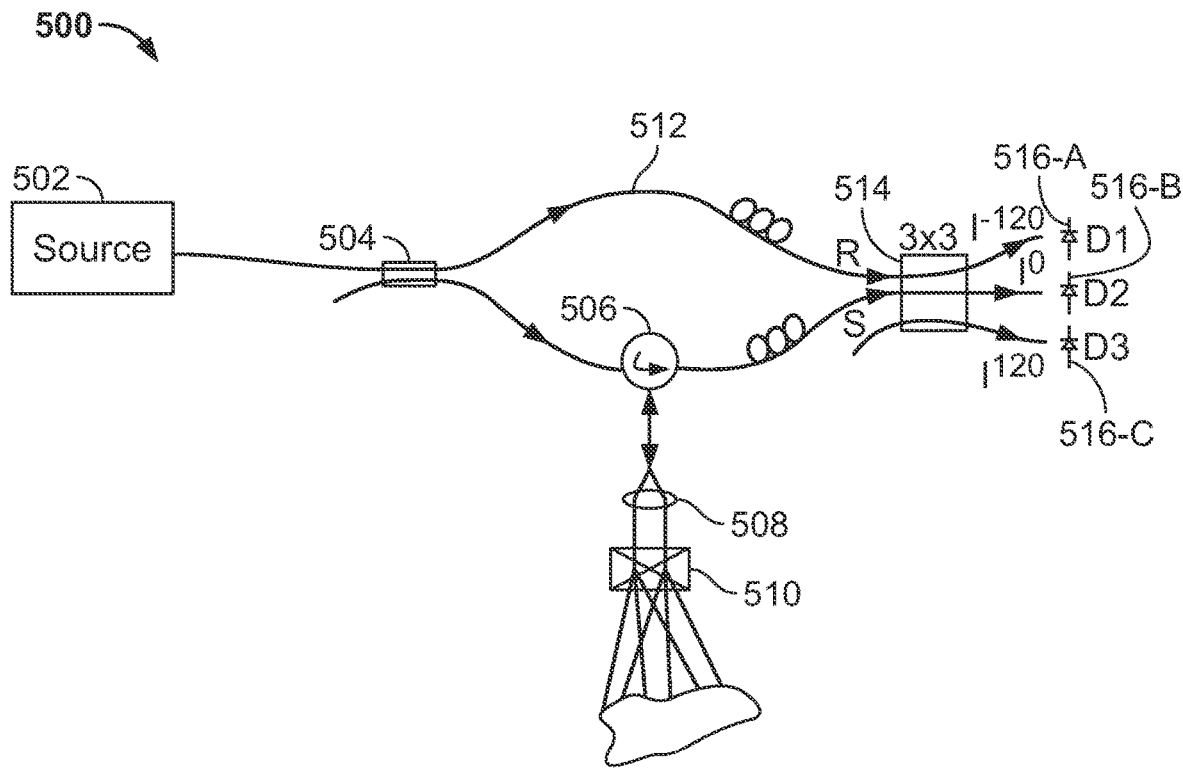
FIG. 5A illustrates a 1-D 3×3 optical coupler, fiber-optic circulator configuration that may be used in a system for rapid coherent synthetic wavelength interferometric absolute distance measurement.

FIG. 5A illustrates a 1-D 3×3 optical coupler, fiber-optic circulator configuration that may be used in a system for rapid coherent synthetic wavelength interferometric absolute distance measurement. Referring to FIG. 5A, optical system 500 includes a laser source 502, a fiber coupler 504, a fiber optic circulator 506, a collimating lens 508, an optical scanner 510, a transmissive reference arm 512, a 3×3 fiber optic coupler 514, and three detectors 516-A, 516-B, 516-C. The direction of light propagating in the various arms is indicated by arrows. The 3×3 fiber optic coupler 514 is a low-cost solution for phase-stepped coherent detection, as it provides three outputs with 120 degree phase separation detected at detectors D1, D2, D3 516-A, 516-B, 516-C, which provide the signals $I_1^{-120}$, $I_1^0$ and $I_1^{120}$ as required by the formulas provided in the Theoretical Evaluation section for phase-stepped phase-based and magnitude-based calculation of the interferometer pathlength difference at each wavelength.

Figure 5B:
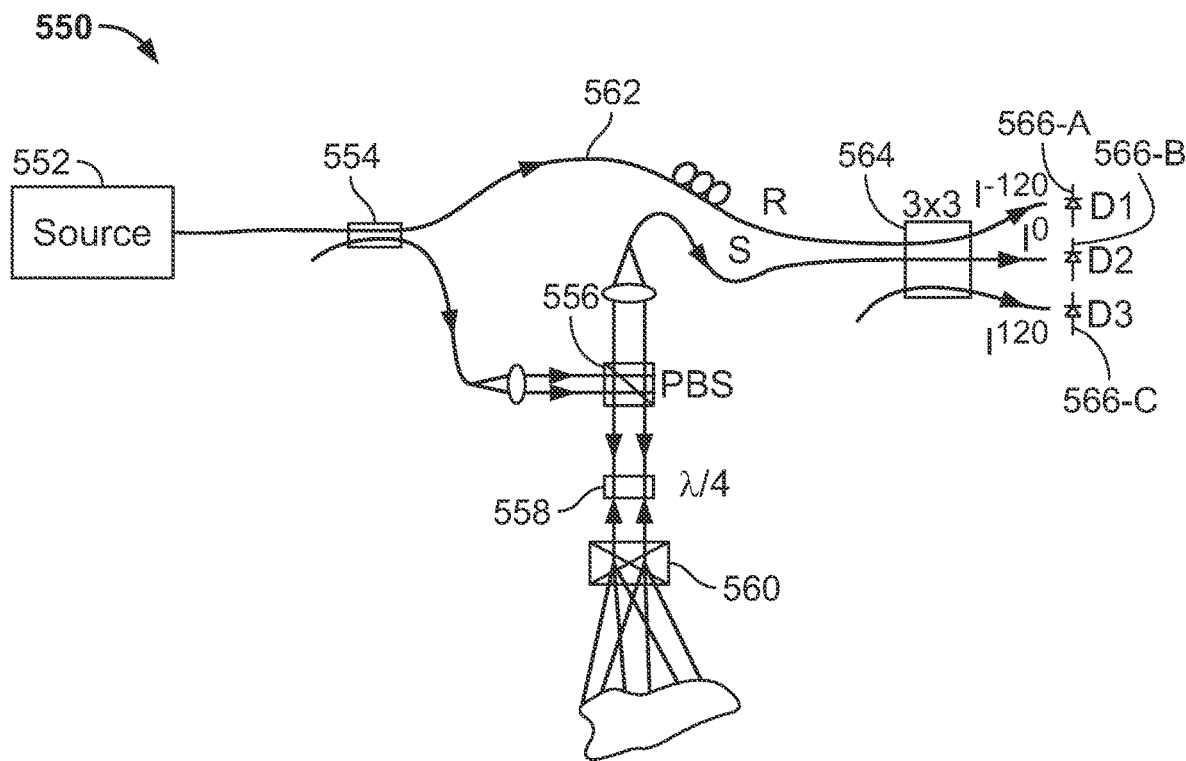
FIG. 5B illustrates a 1-D 3×3 optical coupler, polarization-encoded high isolation configuration that may be used in a system for rapid coherent synthetic wavelength interferometric absolute distance measurement.

FIG. 5B illustrates a 1-D 3×3 optical coupler, polarization-encoded high isolation configuration that may be used in a system for rapid coherent synthetic wavelength interferometric absolute distance measurement. Referring to FIG. 5B, optical system 550 includes a laser source 552, a fiber coupler 554, a directional polarization gate 556, a quarter wave plate 558, an optical scanner 560, a transmissive reference arm 562, a 3×3 fiber optic coupler 564, and three detectors 566-A, 566-B, 566-C. The direction of light propagating in the various arms is indicated by arrows. As can be seen. FIG. 5B differs from FIG. 5A by the use of directional polarization gating in the sample arm, which operates as described with respect to FIG. 3B.

Figure 6:
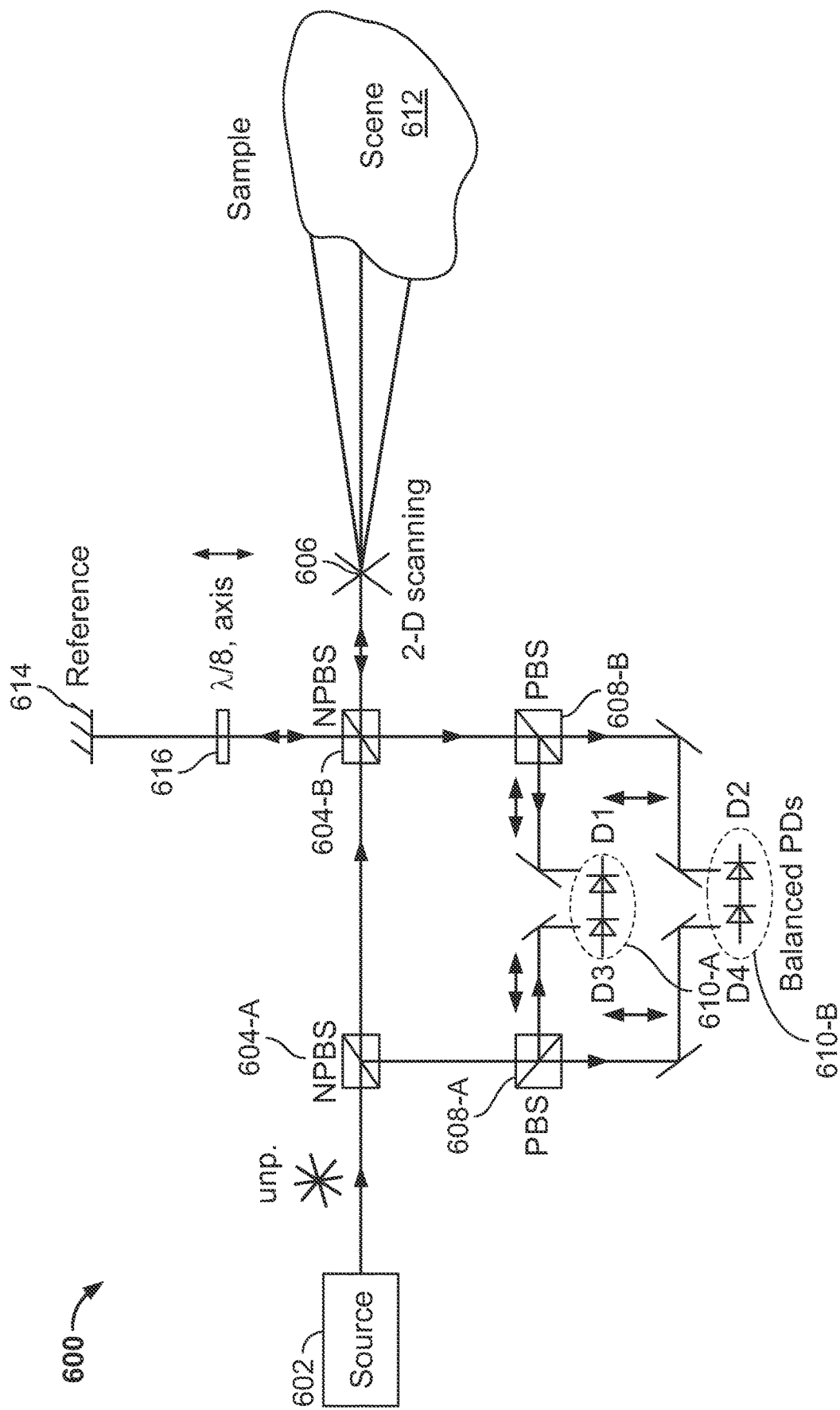
FIG. 6 illustrates a 1-D polarization encoded, bulk optic optical system configuration that may be used in a system for rapid coherent synthetic wavelength interferometric absolute distance measurement.

FIG. 6 illustrates a 1-D polarization encoded, bulk optic optical system configuration that may be used in a system for rapid coherent synthetic wavelength interferometric absolute distance measurement. A system for rapid single-channel (1-D) polarization encoded simultaneous quadrature detection at a single wavelength in bulk optics can be implemented as optical system 600. Optical system 600 includes a laser source 602, two non-polarized beamsplitters (NPBS) 604-A, 604-B, optical scanner 606, two polarized beamsplitters (PBS) 608-A, 608-B, and two pairs of balanced differential optical receivers 610-A, 610-B. Light polarization in the various arms is indicated using double-sided arrows.

The laser source 602 is assumed unpolarized, and the source light is split into sample (e.g., of scene 612) and reference (e.g., reference 614) paths using NPBS 604-B. Light propagating (e.g., through an eighth-wave birefringent plate 616) in the reference arm 614 with vertical polarization axis is delayed by 90° (round trip) relative to horizontally polarized reference arm light. Light in the sample arm 612 is collimated or focused (for increased light collection efficiency, not shown) in the neighborhood of the sample surface of scene 612 and laterally scanned in 1 or 2 lateral directions by scanner 606, which can be any suitable scanning mechanism such as some combination of galvanometer scanners, resonant scanners, MEMS scanners, rotating polygonal mirrors, acousto-optic scanners, or any other lateral light scanning technology. Light reflected from the sample of scene 612 is combined with light returning from the reference arm 614 in the NPBS 604-B and directed (e.g., via NBPS 604-A and mirrors) to a pair of polarization-separated (e.g., via PBS 608-A, 608-B) high-speed balanced differential optical receivers. D1-D3 610-A and D2-D4 610-B. With this configuration, interfering light in matching polarization states impinging on each detector will have a phase shift of 0° (D1). 90° (D2). 180° (D3), and 270° (D4) between sample 612 and reference arm 614 optical paths, as needed for the four phase-stepping quadrature measurements. Thus, the output of differential receiver 610-A provides $I_1^0$-$I_1^{180}$, and the output of differential receiver 610-B provides $I_1^{90}$-$I_1^{270}$, as required by the provided formulas for phase-stepped phase-based and magnitude-based calculation of the interferometer pathlength difference at each wavelength. In some cases, optical circulators or a transmissive reference arm can be used to improve the topological efficiency of the illustrated configuration.

Figure 7:
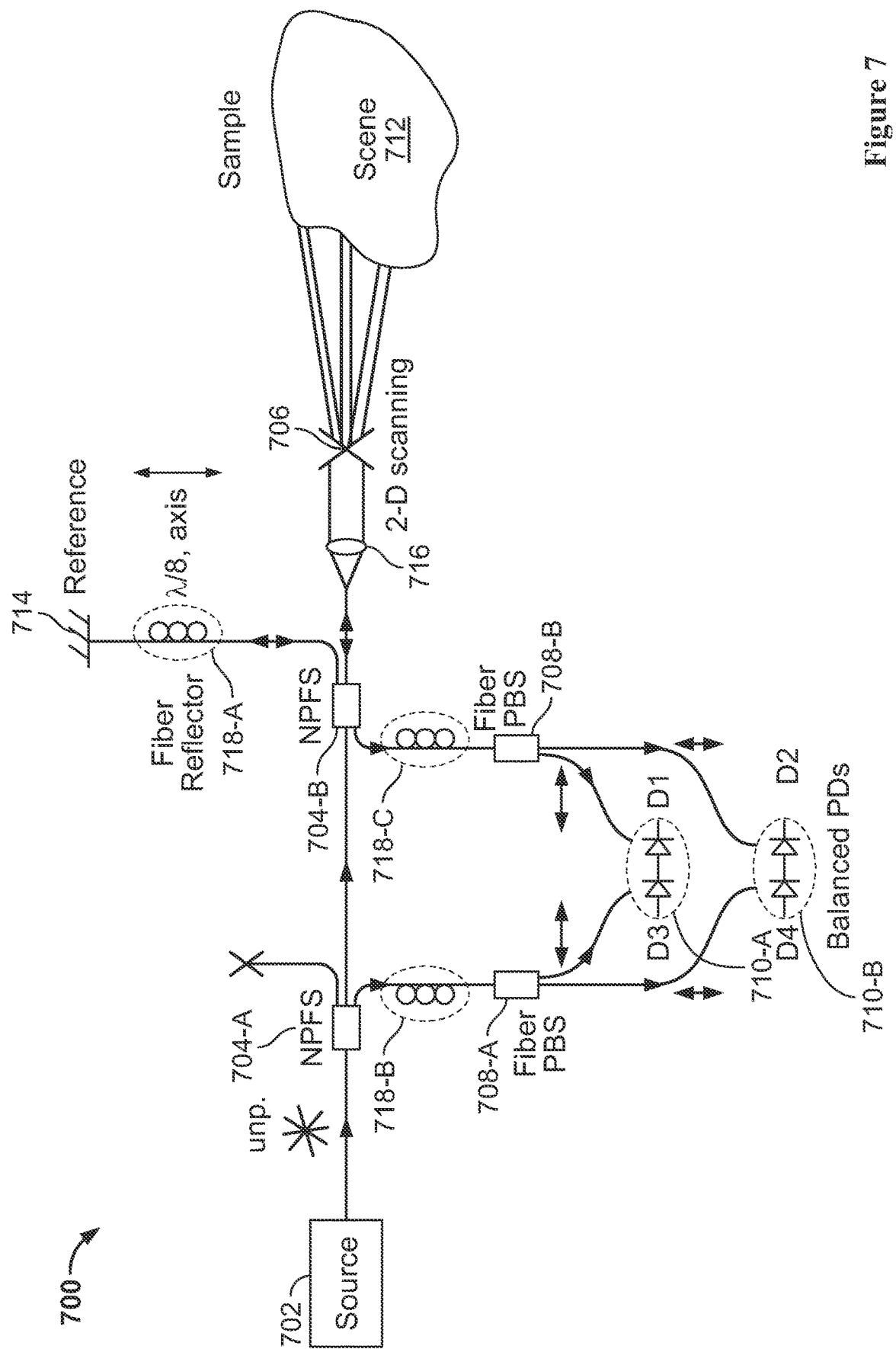
FIG. 7 illustrates a 1-D polarization encoded, fiber optic optical system configuration that may be used in a system for rapid coherent synthetic wavelength interferometric absolute distance measurement.

FIG. 7 illustrates a 1-D polarization encoded, fiber optic optical system configuration that may be used in a system for rapid coherent synthetic wavelength interferometric absolute distance measurement. Referring to FIG. 7, optical system 700 includes a laser source 702, two non-polarized fiber splitters (NPFS) 704-A, 704-B, optical scanner 706, two fiber polarizing beamsplitters (fiber PBS) 708-A, 708-B, and two pairs of optical receivers 710-A, 710-B. Light polarization in the various arms is indicated using double-sided arrows.

FIG. 7 illustrates the same interferometer topology as FIG. 6, but implemented using fiber optics. For example, the laser source 702 is unpolarized, and the source light is split into sample (e.g., of scene 712) and reference (e.g., reference 714) paths using NPFS 704-B. Light in the sample arm 712 is collimated or focused (e.g., using lens 716, for increased light collection efficiency) in the neighborhood of the sample surface of scene 712 and laterally scanned in 1 or 2 lateral directions by optical scanner 706, which can be any suitable scanning mechanism such as some combination of galvanometer scanners, resonant scanners. MEMS scanners, rotating polygonal mirrors, acousto-optic scanners, or any other lateral light scanning technology. Light reflected from the sample of scene 712 is combined with light returning from the reference arm 714 in the NPFS 704-B and directed to a pair of polarization-separated (e.g., via fiber PBS 708-A, 708-B) high-speed differential optical receivers, D1-D3 710-A and D2-D4 710-B. With this configuration, interfering light in matching polarization states impinging on each detector will have a phase shift of 0° (D1), 90° (D2), 180° (D3), and 270° (D4) between sample 712 and reference arm 714 optical paths, as needed for the four phase-stepping quadrature measurements. Thus, the output of differential receiver 710-A provides $I_1^0$-$I_1^{180}$, and the output of differential receiver 710-B provides $I_1^{90}$-$I_1^{270}$, as required by the provided formulas for phase-stepped phase-based and magnitude-based calculation of the interferometer pathlength difference at each wavelength. In some cases, optical circulators or a transmissive reference arm can be used to improve the topological efficiency of the illustrated configuration.

In the illustrated implementation, fibers prior to the fiber PBSs 708-A, 708-B are non-polarization-maintaining (non-PM) fibers, and the fibers emerging from the fiber PBSs 708-A, 708-B are PM fibers. Since non-PM fibers can have birefringence depending upon their specific length and bending-induced stress, fiber polarization controllers 718-A, 718-B, 718-C are included (shown as sets of three sequential fiber loops in FIG. 7). Fiber polarization controller 718-A is inserted in the reference arm 714 to set the required 90° round trip phase delay for vertical compared to horizontally polarized reference arm light, and fiber polarization controllers 718-B, 718-C are inserted in both fiber PBS arms 708-A, 708-B to cancel out any birefringence in those fiber lengths.

Figure 8:
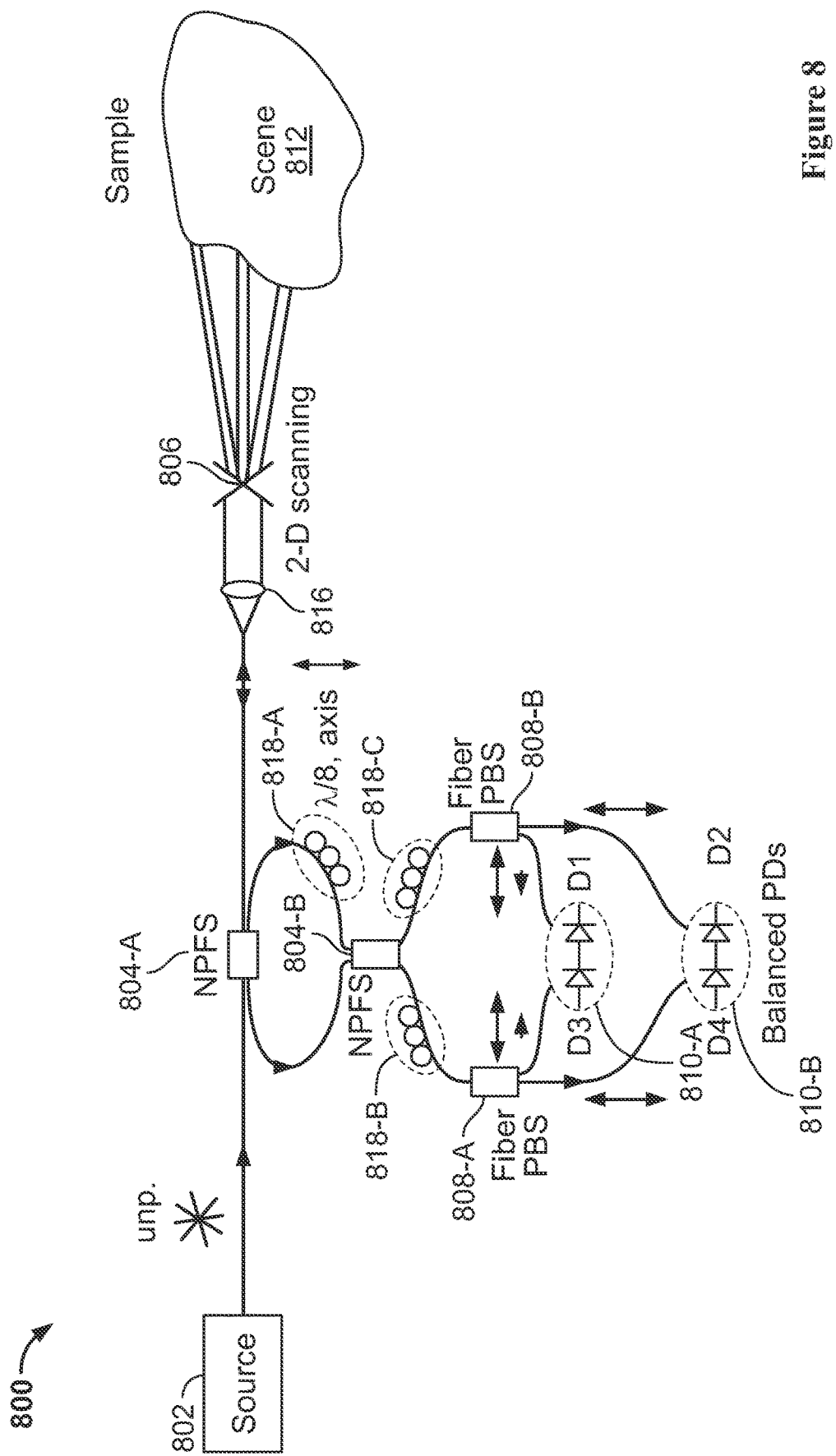
FIG. 8 illustrates a 1-D polarization encoded, fiber optic, transmissive reference optical system configuration that may be used in a system for rapid coherent synthetic wavelength interferometric absolute distance measurement.

FIG. 8 illustrates a 1-D polarization encoded, fiber optic, transmissive reference optical system configuration that may be used in a system for rapid coherent synthetic wavelength interferometric absolute distance measurement. FIG. 8 illustrates the single-channel, simultaneous polarization encoded quadrature interferometer implemented in fiber optics, but with a transmissive reference arm topology. This topology can achieve similar results as that achieved by the configuration shown in FIG. 7, but with more efficient utilization of reference arm light (none of which is returned to the source as in FIGS. 6 and 7) and fewer overall components. In some cases, the implementation shown in FIG. 8 can be a preferred embodiment for rapid single-channel quadrature detection, ideal for wavelengths in the $\lambda_0 \sim 1.5$ µm region where all required components are readily available from the fiber communications industry.

Referring to FIG. 8, optical system 800 includes a laser source 802, two non-polarized fiber splitters (NPFS) 804-A, 804-B, optical scanner 806, two fiber polarizing beamsplitters (fiber PBS) 808-A, 808-B, and two pairs of balanced differential optical receivers 810-A, 810-B. Light polarization in the various arms is indicated using double-sided arrows.

Here, the laser source 802 is unpolarized, and the source light is split into a sample (e.g., of scene 812) and a transmissive reference arm path using NPFS 804-A. Light in the sample arm 812 is collimated or focused (e.g., using lens 816, for increased light collection efficiency) in the neighborhood of the sample surface of scene 812 and laterally scanned in 1 or 2 lateral directions by optical scanner 806, which can be any suitable scanning mechanism such as some combination of galvanometer scanners, resonant scanners, MEMS scanners, rotating polygonal mirrors, acousto-optic scanners, or any other lateral light scanning technology. Light reflected from the sample of scene 812 is combined with light in the transmissive reference arm path in the NPFS 804-B and directed to a pair of polarization-separated (e.g., via fiber PBS 808-A, 808-B) high-speed balanced differential optical receivers. D1-D3 810-A and D2-D4 810-B. With this configuration, interfering light in matching polarization states impinging on each detector will have a phase shift of 0° (D1), 90° (D2), 180° (D3), and 270° (D4) between the paths, as needed for the four phase-stepping quadrature measurements. Thus, the output of differential receiver 810-A provides $I_1^0 - I_1^{180}$, and the output of differential receiver 810-B provides $I_1^{90} - I_1^{270}$, as required by the provided formulas for phase-stepped phase-based and magnitude-based calculation of the interferometer pathlength difference at each wavelength. Fiber polarization controllers 818-A, 818-B, 818-C are also included (shown as sets of three sequential fiber loops in FIG. 8).

Although the implementations in FIGS. 6-8 are all depicted as single channel, with the range measurement performed sequentially for each spot on the sample and the beam rapidly scanned (in 1 or 2 more dimensions) across the sample, polarization encoded quadrature detection can also be done in parallel using line or area scan cameras, by simple extension of FIG. 6. For example, the combined polarization-encoded quadrature components can be polarization separated, then imaged onto either separate individual cameras, or onto different regions of one large camera. This can be done using the camera for one dimension (e.g., line scan cameras) and lateral scanning in the other dimension (which has the advantage of achieving up to 100 Khz line scan rate in order to overcome phase washout concerns), or by using area cameras to capture the entire polarization-encoded 2D scene simultaneously (useful for static scenes).

Figure 9A:
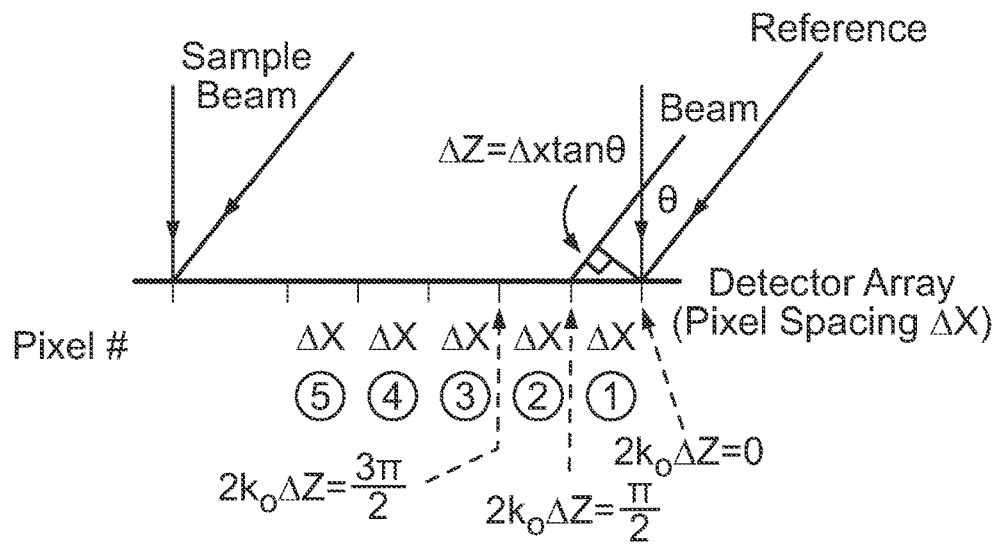
FIG. 9A illustrates operation of off-axis holography.

FIG. 9A illustrates operation of off-axis holography, understood as a phase-sweeping quadrature detection approach. Referring to FIG. 9A, the x-axis shows pixel number, with pixel spacing of a detector array being $\Delta x$. With this configuration, off-axis holography may be described as a phase sweeping approach, where for the appropriate angle between the sample and reference beams (as shown), pixel 1 integrates phase differences between sample and reference from $0-\pi/2$, pixel 2 integrates phase difference from $\pi/2-\pi$, and so on. The mathematics for phase-sweeping quadrature detection are very similar to that for phase-stepping approaches as described in the Theoretical Evaluation Section.

Figure 9B:
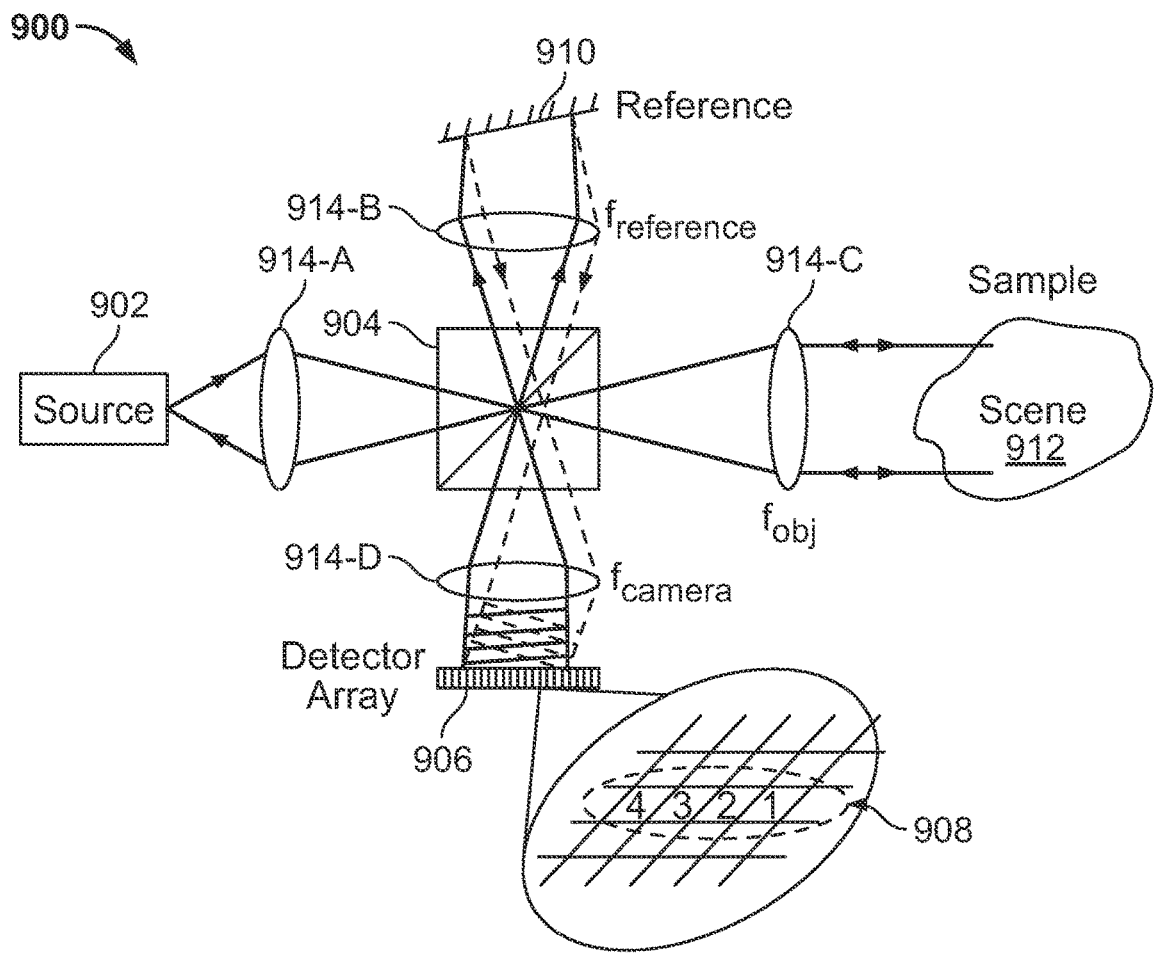
FIG. 9B illustrates an off-axis holographic optical system configuration that may be used in a system for rapid coherent synthetic wavelength interferometric absolute distance measurement.

FIG. 9B illustrates an off-axis holographic optical system configuration that may be used in a system for rapid coherent synthetic wavelength interferometric absolute distance measurement. Referring to FIG. 9B, an off-axis holographic optical system configuration can be 2D (using a line camera) or 3D (using an area camera). Optical system 900 includes a laser source 902, beam splitter 904, and detector array 906 associated with camera 908 (which may be a line camera (not shown) or an area camera (as depicted in 908).

In this implementation, light from the laser source 902 illuminates both the reference reflector 910 and the sample scene 912, both of which are imaged (with magnification $-f_{camera}/f_{reference}$ and $-f_{camera}/f_{sample}$, respectively) onto a line-scan or area-scan camera (e.g., camera 908). The reference arm reflector 910 is tilted a small angle such that when imaged onto the detector 906, given the detector pixel spacing, the differential phase delay between reference and sample beams as described in FIG. 9A holds. The $f_{reference}$, $f_{sample}$, and $f_{camera}$ represent the focal lengths of the lenses used in the reference, sample, and detector interferometer arms (914-B, 914-C, 914-D), respectively. Using this approach, camera pixels D1, D2, D3, D4 (see arrow from reference 908) obtain $\pi/4$ phase-separated interferometer measurements required for either phase-based or magnitude-based distance measurements. In particular, for the appropriate angle between the sample and reference beams on a line-scan or area detector, each set of four sequential detector pixels integrate the interferometric signal over $\pi/2$ accumulating phase difference between reference and sample arms. Thus, each set of four neighboring detector elements senses the interferogram components needed for the four phase-sweeping quadrature measurements (see e.g., theoretical evaluation discussion of phase sweeping equivalents, which can be used for either the phase-based approach or the magnitude-based approach). Thus, the digitized output of pixels 1, 2, 3, and 4 in FIG. 9B provide the values of $I_1^{0-90}$, $I_1^{90-180}$, $I_1^{180-270}$, $I_1^{270-360}$, as required by the provided formulas for phase-swept phase-based and magnitude-based calculation of the interferometer pathlength difference at each wavelength.

For off-axis holography using an area detector, all lenses depicted in FIG. 9B (e.g., lenses 914-A, 914-B, 914-C, 914-D) can be spherical, except for a small correction which can be optically designed to ensure that the point spread function (PSF) of the sample and reference beams imaged onto the detector array 906 are elongated by a factor of 4 in the angle offset direction (see downward directed arrows from reference reflector 910). For off-axis holography with a line detector, a combination of spherical and cylindrical optics can be used for lenses 914-A, 914-B, 914-C, 914-D to ensure that the source laser light 902 is focused into a slit on the sample 912 and reference 910, which are then aligned and imaged onto a 1D detector array.

As explained above, it is desirable to have an acquisition technique capable of acquiring ~1K horizontal×~1K lateral points, each with 8- to 10-bits range resolution (thus maintaining ~1K resolvable depth points) at around video rate, or around 1K×1K×1 byte×30≈30 MB/sec data throughput rate. Using modern optical communications-grade equipment/ components in combination with the binary successive approximation approaches described herein, this should be readily achievable.

FIG. 10A illustrates components of a controller that may be used in a system for rapid coherent synthetic wavelength interferometric absolute distance measurement. Referring to FIG. 10A, a controller 1000 for an optical system is configured to control operation of components of the optical system, including the laser source, any moving parts (e.g., optical switches, optical scanner, optical modulator/actuator), and output (e.g., detector/balanced detector/linescan camera/2D camera operation, syncing, and acquisition operation). Controller 1000 can include a processor 1010 and memory 1020 storing instructions for performing the appropriate control operations (e.g., to tune or select a laser source of appropriate wavenumber/wavelength for each acquisition). In some cases, the controller 1000 directs the optical system to tune to separate wavelengths sequentially in time. In some cases, the controller 1000 directs the optical system to illuminate two or more wavelengths simultaneously and to measure interference separately using wavelength selective filtering (e.g. using optical add/drop filters commonly used in the optical communications industry) or differential modulation (i.e., including means for amplitude or phase modulation of the different wavelengths at different frequencies, followed by frequency-selective or lock-in detection for later separating them out). In some cases, the controller 1000 directs the optical system to illuminate each wavelength separately and to measure phase values sequentially. In some cases, the controller 1000 directs the optical system for phase sweeping coherent quadrature detection, for example, using a continuously moving piezoelectric actuator or using off-axis holography. Details of these approaches can be found in the theoretical evaluation section and discussion of FIGS. 3A, 3B, 4A, 4B 5A, 5B, 6, 7, 8, 9A, and 9B.

FIG. 10B illustrates components of a computing system that may be used in a system for rapid coherent synthetic wavelength interferometric absolute distance measurement.

Components of computing device 1050 may represent an imaging system, a personal computer, a mobile device, a wearable computer, a smart phone, a tablet, a laptop computer, or other computing device. Accordingly, more or fewer elements described with respect to computing device 1050 may be incorporated to implement a particular computing device.

Computing device 1050 can include at least one processor 1055 connected to components via a system bus 1060: a system memory 1065 and a mass storage device 1070. Examples of processor 1055 include general purpose central processing units (CPUs), graphics processing units (GPUs), field programmable gate arrays (FPGAs), application specific processors, and logic devices, as well as any other type of processing device, combinations, or variations thereof.

It can be understood that the mass storage device 1070 may involve one or more memory components including integrated and removable memory components and that one or more of the memory components can store instructions 1075 for performing a method of rapid coherent synthetic wavelength interferometric absolute distance measurement such as described with respect to method 200 of FIG. 2. In some cases, computing device 1050 can also be used to implement controller 120 of FIG. 1 (and can perform both control and distance measurement functionality via appropriate instructions stored in mass storage device 1070 or additional logic devices).

Examples of mass storage device 1070 include removable and non-removable storage media including random access memory, read only memory, magnetic disks, optical disks, CDs, DVDs, flash memory, magnetic cassettes, magnetic tape, magnetic disk storage or other magnetic storage devices, or any other suitable storage media. Mass storage device 1070 does not consist of propagating signals or carrier waves.

The system memory 1065 may include a random-access memory ("RAM") and/or a read-only memory ("ROM"). The RAM generally provides a local storage and/or cache during processor operations and the ROM generally stores the basic routines that help to transfer information between elements within the computer architecture such as during startup.

The system can further include user interface system 1080, which may include input/output (I/O) devices and components that enable communication between a user and the computing device 1050. User interface system 1080 can include one or more input devices such as, but not limited to, a mouse, track pad, keyboard, a touch device for receiving a touch gesture from a user, a motion input device for detecting non-touch gestures and other motions by a user, a microphone for detecting speech, and other types of input devices and their associated processing elements capable of receiving user input. The user interface system 1080 may also include one or more output devices such as, but not limited to, display screen(s), speakers, haptic devices for tactile feedback, and other types of output devices. In certain cases, the input and output devices may be combined in a single device, such as a touchscreen display which both depicts images and receives touch gesture input from the user.

The network interface 1085 allows the system to communicate with other computing devices, including server computing devices and other client devices, over a network.

Certain techniques set forth herein may be described in the general context of computer-executable instructions, such as program modules, executed by one or more computing devices. Generally, program modules include routines, programs, objects, components, and data structures that perform particular tasks or implement particular abstract data types.

Embodiments may be implemented as a computer process, a computing system, or as an article of manufacture, such as a computer program product or computer-readable medium. Certain methods and processes described herein can be embodied as code and/or data, which may be stored on one or more computer-readable media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system and encoding a computer program of instructions for executing a computer process.

It should be understood that as used herein, in no case do the terms "storage media," "computer-readable storage media" or "computer-readable storage medium" consist of transitory carrier waves or propagating signals. Instead, "storage" media refers to non-transitory media.

Theoretical Evaluation

The detected signal intensity from an optical interferometer, or optical system, such as illustrated in FIGS. 3A, 3B, 4A, 4B, 5A, 5B, 6, 7, 8, and 9B at wavelength $\lambda_1$ may be written as $I_1 = A + B \cos(\phi_1)$ (Eq. 1). Here, A is proportional to the average sum of the light intensities returning from the sample and reference arms of the interferometer multiplied by the gain of the detector, but may also include offsets due, for example, to direct-current (DC) bias in the voltage or current produced by the optical detector employed to detect $I_1$. Similarly, B is proportional to the product of the light intensities returning from the sample and reference arms of the interferometer multiplied by the gain of the detector, but may also include additional factors related to the degree of matching of the polarization states in the interferometer arms. The phase $\phi_1 = 2k_1\Delta z$ includes the wavenumber $k_1 = 2\pi/\lambda_1$ corresponding to light at wavelength $\lambda_1$. $\Delta z$ is the optical path-length difference between the interferometer arms from which the distance from some known known reference point in the sample arm (e.g., the beamsplitter or fiber tip position) to the object surface may be extracted as the desired ranging measurement.

Various methods for coherent detection are available which consist in obtaining multiple phase-separated or phase-swept measurements of $I_1$ such that $\phi_1$ may be solved (independent of A and B, but modulo $\pm\pi$). These methods form the basis for the industry of nanometer-scale metrology of surfaces, however such measurements suffer from phase wrapping if object surface variations exceed $\lambda_0/2$ (the so-called measurement "ambiguity length") due to the periodicity of the inverse cosine. However, if another interference measurement $I_2$ at another wavelength $\lambda_1$ is also obtained, the two measurements taken together are characterized by the so-called "synthetic wavelength" $\Lambda_{12} = 2\pi/\Delta k_{12} = \lambda_1\lambda_2/(\lambda_2-\lambda_1)$, where $\Delta k_{12} = k_1 - k_2$, where $k_n = 2\pi/\lambda n$, $\lambda n$ is a particular wavelength of light, and n is an index representing distinct wavelengths of light. Importantly, the ambiguity length associated with this measurement is also extended to $\Lambda_{12}/2$, so a proper choice of $(\lambda_1, \lambda_2)$ can lead to arbitrary unambiguous target distance measurement, so long as each of $\lambda_1$ and $\lambda_2$ has sufficiently narrow linewidth so that their corresponding coherence length is also at least $\Lambda_{12}$. For example, for $\Lambda_{12} = 1$ m, $\lambda_1 - \lambda_2 \approx 1$ pm and both $(\lambda_1, \lambda_2)$ must have $\leq 1$ pm or $\leq 300$ MHz linewidth (assuming operation at the 1.5 μm optical communications wavelength).

The illustrated approaches for rapid coherent synthetic wavelength interferometric absolute distance measurement can utilize coherent quadrature detection, for example, via phase stepping coherent quadrature detection and phase sweeping coherent quadrature detection. In general, coherent quadrature detection consists in obtaining measurements proportional to the detected interferometric signal in "quadrature", i.e., separated by 90 degrees, often referred to as the real and imaginary components of the interferometric signal. Once the real and imaginary components are obtained, Eq. 1 may be solved for parameters useful for absolute distance measurement such as B and $\phi 1$, assuming A is consistent between the measurements. However, since both A and B included detector-specific factors, and since high-speed measurements are sensitive to optical noise sources such as excess noise arising from non-ideal light sources, a more common approach for high-speed and high-sensitivity coherent quadrature detection is to utilize an interferometer topology which allows for differential measurement of each of the real and imaginary components of the interferometric signal, obtained from four fixed $\pi/2$ radian separated measurements of $I_1$ obtained from two balanced differential detectors (see e.g., various optical systems shown herein). However, it should be understood that the principles disclosed here for rapid coherent synthetic wavelength interferometric absolute distance measurement may equally take advantage of many other approaches which are well known in the art of interferometry for detection of the real and imaginary components of the interferometric signal.

Phase stepping coherent quadrature detection consists of methods for acquiring interferometric signal measurements at each of four fixed $\pi/2$ radian separated phase steps, either sequentially such as using a stepped piezoelectric actuator, or simultaneously such as with a 90 degree optical hybrid or with polarization phase encoding. For the case of phase stepping coherent quadrature detection, the interferometric measurements obtained are:

$$I_1^0 = A + B\cos(\phi_1),$$

$$I_1^{90} = A + B\cos\left(\phi_1 + \frac{\pi}{2}\right) = A + B\sin(\Phi_1),$$

$$I_1^{180} = A + B\cos(\phi_1 + \pi) = A - B\cos(\Phi_1),$$

$$I_1^{270} = A + B\cos\left(\phi_1 + \frac{3\pi}{2}\right) = A - B\sin(\Phi_1).$$

These expressions may be solved for the parameters A, |B|, and $2k_1\Delta z$ as follows:

$$A = \frac{I_1^0 + I_1^{180}}{2} = \frac{I_1^{90} + I_1^{270}}{2},$$

$$|B| = \frac{\sqrt{(I_1^0 - I_1^{180})^2 + (I_1^{90} - I_1^{270})^2}}{2},$$

$$\phi_1 = 2k_1\Delta z = \tan^{-1}\left[\frac{I_1^{90} - I_1^{270}}{I_1^0 - I_1^{180}}\right].$$

For the case of an optical system based on a 3×3 fiber coupler, phase stepping coherent quadrature detection requires modified formulae since the three outputs of the coupler provide phase-separated measurements of $2\pi/3$ radians (120 degrees) rather than $\pi/2$ radians (90 degrees). In this case, assuming three 120 degree separated interferometric measurements are obtained as $I_1^{-120}$, $I_1^0$ and $I_1^{120}$, then the relevant formulae for |B| and $2k_1\Delta z$ are as follows:

$$Re_1 = \frac{2I_1^0 - I_1^{120} - I_1^{-120}}{3}$$

$$Im_1 = \frac{I_1^{120} + I_1^{-120}}{\sqrt{3}}$$

$$|B| = \sqrt{(Re_1)^2 + (Im_1)^2},$$

$$\phi_1 = 2k_1\Delta z = \tan^{-1}\left[\frac{Im_1}{Re_1}\right].$$

Phase sweeping coherent quadrature detection (sometimes referred to as "integrating buckets" consists of methods for acquiring interferometric signal measurements while sweeping the pathlength difference over $\pi/2$ during each acquisition. This can also be accomplished either sequentially such as using a continuously moving piezoelectric actuator, or simultaneously such as with off-axis holography, in which case the pathlength difference between reference and sample arms increases continuously across each detector pixel element. For the case of phase sweeping coherent quadrature detection, the interferometric measurements obtained are $$I_1^{0-90} = A + B \int_0^{\frac{\pi}{2}} \cos(\phi_1 + \theta) d\theta,$$

$$I_1^{90-180} = A + B \int_{\frac{\pi}{2}}^{\pi} \cos(\phi_1 + \theta) d\theta,$$

$$I_1^{180-270} = A + B \int_{\pi}^{\frac{3\pi}{2}} \cos(\phi_1 + \theta) d\theta,$$

$$I_1^{270-360} = A + B \int_{\frac{3\pi}{2}}^{2\pi} \cos(\phi_1 + \theta) d\theta.$$

These expressions may be solved for the parameters A, |B|, and $2k_0 k_1 \Delta z$ as follows:

$$A = \frac{I_1^{0-90} + I_1^{90-180}}{2} = \frac{I_1^{90-270} + I_1^{270-360}}{2},$$

$$|B| = \frac{\sqrt{(I_1^{0-90} - I_1^{180-270})^2 + (I_1^{90-180} - I_1^{270-360})^2}}{2},$$

$$2k_1 \Delta z = \tan^{-1}\left[\frac{I_1^{90-180} - I_1^{270-360}}{I_1^{0-90} - I_1^{180-270}}\right].$$

Either the phase stepping or the phase sweeping approaches may be used with the corresponding described optical configurations. It should be understood that these expressions are examples valid only for the simplest phase stepping or phase sweeping approaches using 4 equally spaced steps or sweeps: other approaches using more or less phase steps or sweeps to solve for the parameters A, |B|, and $2k_1 \Delta z$ may also be derived as have been used for alternative optical metrology designs.

Phase-Based Approach

As described above, one method of obtaining an absolute distance measurement (e.g., the distance from a known position in the sample arm to the surface or principal reflection from an object in a scene) is a phase-based approach. The phase-based approach uses the phases of the interferometric signal intensity at two separate wavelengths measured separately, using any of multiple available techniques for phase-sensitive interferometry. This can be done with both wavelengths illuminated simultaneously and some means implemented for detecting them separately (such as wavelength selective filtering or differential modulation), or more simply by just illuminating each wavelength and recording the phase values sequentially. In either case, one obtains a phase measurement at each of the separated wavelengths (Eq. 2):

$$\phi_1 = 2k_1 \Delta z,$$

$$\phi_2 = 2k_2 \Delta z.$$

Intuitively, the phase of the interferogram at each wavelength will accumulate $2\pi$ for each fringe at that wavelength, such that at the round-trip distance corresponding to the synthetic wavelength $\Lambda_{12}$ the interferogram for the shorter wavelength will have accumulated one additional fringe and thus $2\pi$ additional (round trip) phase compared to the interferogram at the longer wavelength. Thus, the distance to the reflector can be obtained from the difference between the phases accumulated at each wavelength, scaled by the wavenumber difference (Eq. 3):

$$\Delta z = \frac{\phi_1 - \phi_2}{2\Delta k_{12}}.$$

However, this results in a phase wrapping artifact whenever $(\phi_1 - \phi_2) < 0$, which can be taken care of by asserting the condition (Eq. 4):

$$\text{if } (\phi_1 - \phi_2) < 0, \text{ then } (\phi_1 - \phi_2) = (\phi_1 - \phi_2) + \pi.$$

Since the phase difference accumulates to $2\pi$ over the length of the synthetic wavelength $\Lambda_{12}$ the (single pass) pathlength difference "ambiguity length" for the phase-based approach corresponds to (Eq. 5):

$$\Delta z^{amb,phase} = \Lambda_{12}/2.$$

Many approaches are possible to obtain the required phase measurements for the phase-based approach at $\lambda_1$ and $\lambda_2$. In particular, since each of the component interferograms are at optical wavelengths, avoidance of phase washout due to motion of the sample and/or reference requires that both phase measurements be acquired quickly compared to any motion of the sample or reference on the scale of the optical wavelength. Coherent quadrature detection can be used to achieve this, using modern techniques and available optical components which permit either rapid sequential single-channel phase detection on the ≤nanosecond scale (using optical hybrids or polarization encoding, for example), or rapid parallel multi-channel detection on the ms-µs scale (using off-axis holography with line-scan or rapid area-scan cameras, for example).

Using the coherent quadrature detection approach detailed above, the phase measurements at each of the wavelengths can be obtained using (Eq. 6):

$$\phi_1 = 2k_1 \Delta z = \tan^{-1}\left[\frac{I_1^{90} - I_1^{270}}{I_1^{0} - I_1^{180}}\right],$$

$$\phi_2 = 2k_2 \Delta z = \tan^{-1}\left[\frac{I_2^{90} - I_2^{270}}{I_2^{0} - I_2^{180}}\right].$$

The pathlength difference in the interferometer is expressed explicitly as (Eq. 7):

$$\Delta z = \frac{\phi_1 - \phi_2}{2\Delta k_{12}} = \frac{\tan^{-1}\left[\frac{I_1^{90} - I_1^{270}}{I_1^{0} - I_1^{180}}\right] - \tan^{-1}\left[\frac{I_2^{90} - I_2^{270}}{I_2^{0} - I_2^{180}}\right]}{2\Delta k_{12}}.$$

The phase wrapping artifact solution remains (Eq. 8):

$$\text{if } (\phi_1 - \phi_2) < 0, \text{ then } (\phi_1 - \phi_2) = (\phi_1 - \phi_2) + \pi.$$

Figure 11:
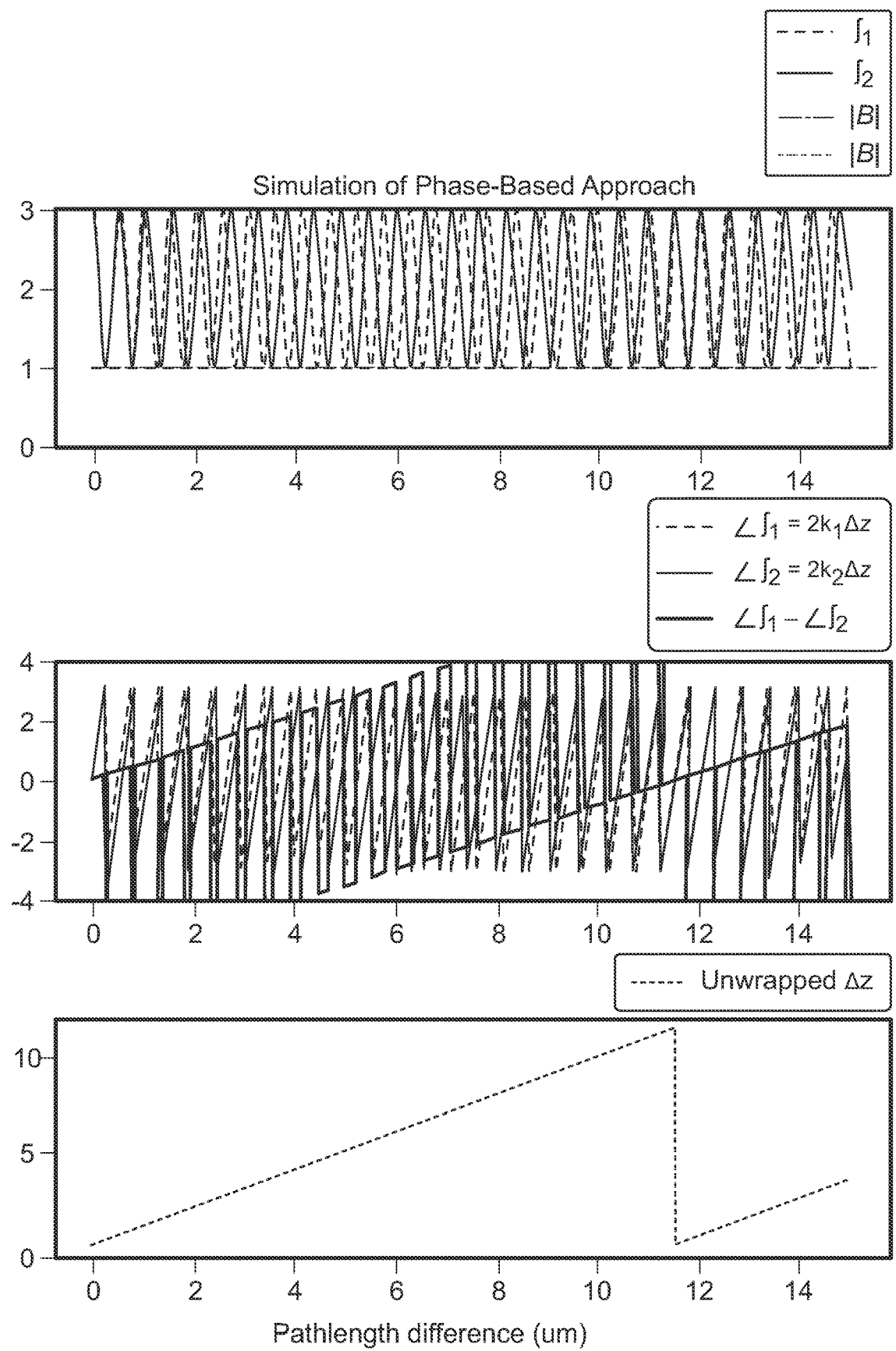
FIG. 11 illustrates a simulation of a phase-based quadrature detection approach.

FIG. 11 illustrates a simulation of a phase-based quadrature detection approach. The indicated parameters are representative of near-infrared light. Referring to FIG. 11, a simulation was carried out for A=2, B=1 at $\lambda_1$=1.05 µm, $\lambda_2$=1.1 µm, resulting in $\Lambda_{12}$=23.1 µm. Note that in this Figure, the simulated pathlength distance is limited to just 10-15 µm, corresponding to just 10-15 interference fringes, in order to clearly illustrate the individual fringes and their phase evolution. However, this methodology works equally as well (i.e., the reconstruction of $\Delta z$ remains artifact-free) for arbitrary narrowing of the wavenumber separation, thus allowing for arbitrary extension of the ambiguity length.

Figure 12:
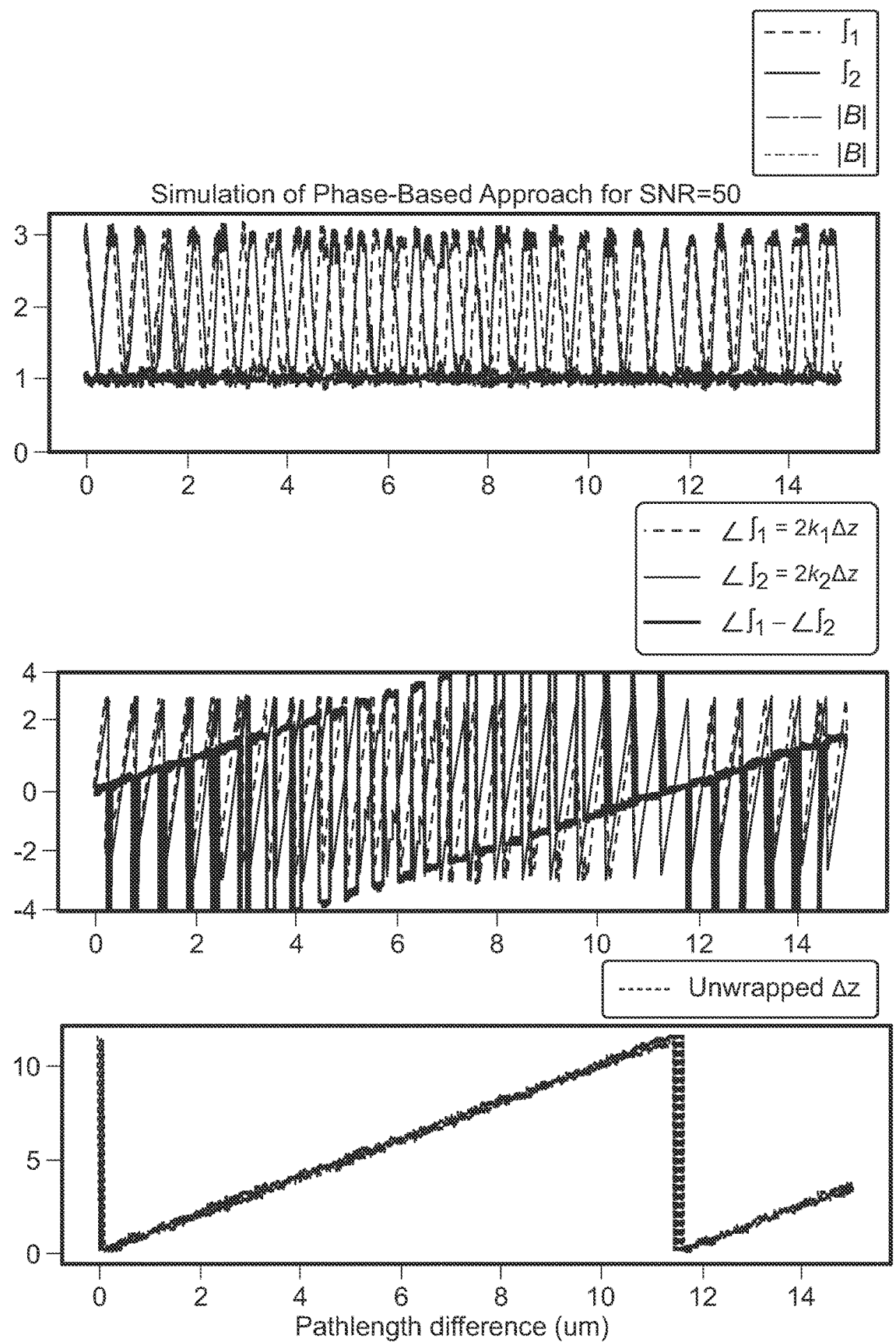
FIG. 12 illustrates the effect of the addition of approximately 1/50th of normally distributed Gaussian noise to each of the interferograms prior to pathlength difference computation in a simulation of a phase-based quadrature detection approach.

One practical question, particularly for any approach based on measuring optical phase, is the robustness of the distance measurement technique to the presence of noise in the detected signals. FIG. 12 illustrates the effect of the addition of approximately $\frac{1}{50}$th of normally distributed Gaussian noise to each of the interferograms prior to pathlength difference computation in a simulation of a phase-based quadrature detection approach. Here, A=2, B=1 at $\lambda_1$=1.05 µm, $\lambda_2$=1.1 µm, resulting in $\Lambda_{12}$=23.1 µm, with Gaussian noise added to $I_1$ and $I_2$ such that SNR ~50. As seen in FIG. 12, the resulting reconstructed pathlength difference also reflects approximately the same noise level, resulting in major errors in pathlength estimation only at the very beginning and end of the estimation range.

Magnitude-Based Approach

As described above, another method of obtaining an absolute distance measurement (e.g., the distance from a known position in the sample arm to the surface or principal reflection from an object in a scene) is a magnitude-based approach, which detects the magnitude or visibility of the interferometric signal at each of two wavelengths. This approach starts with incoherent summation of the detected intensities detected at the two wavelengths $\lambda_1$ and $\lambda_2$ (Eq. 9):

$$I_{12} = I_1 + I_2 = 2A + B[\cos(2k_1\Delta z) + \cos(2k_2\Delta z)] = $$
$$2A + 2B[\cos(2\bar{k}_{12}\Delta z)\cos(\Delta k_{12}\Delta z)]$$

The latter expression is expressed in terms of the mean wavenumber $\bar{k}_{12}=(k_1-k_2)/2$, the difference wavenumber $\Delta k_{12}=k_1-k_2$ defined above, and is simplified using the trigonometric identity $$\cos a + \cos b = 2\cos\left(\frac{a+b}{2}\right)\cos\left(\frac{a-b}{2}\right).$$

$I_{12}$ also represents an interferometric signal with rapid oscillation according to the mean wavenumber $\bar{k}_{12}$, and a much more slowly oscillating envelope which depends on the difference frequency $\Delta k_{12}$. Thus, the summed signal has the form (Eq. 10):

$$I_{12} = 2A + 2B \cdot C_{12}(\Delta k_{12}, \Delta z) \cdot \cos(2\bar{k}_{12}\Delta z),$$

where the "synthetic wavelength envelope amplitude" $C_{12}$ is given by (Eq. 11):

$$C_{12}(\Delta k_{12}, \Delta z) = \cos(\Delta k_{12}\Delta z).$$

The synthetic wavelength envelope amplitude becomes the measurement of interest because it has an extended ambiguity length satisfying $\Delta k_{12}\Delta z^{amb,env}=2\pi$, or $\Delta z^{amb,env}=\Lambda_{12}$ (Eq. 12).

If the synthetic wavelength envelope amplitude $C_{12}$ can be measured experimentally, then the pathlength difference between the reference and a given position on the sample $\Delta z$ can be extracted directly from inversion of Eq. 11, since $\Delta k_{12}$ is known. It is highly desirable that this measurement be independent of A and B, since those variables depend upon details of reference and sample reflectivity, both of which may be both noisy and the latter of which is likely to rapidly vary as a function of position on the sample. Eq. 9 also assumes nearly monochromatic light sources and matching polarization states between the interferometer arms: if these assumptions are relaxed (i.e., for reduced temporal coherence), the form of Eq. 10 still holds with the variables A and B expected to be nearly identical for closely spaced wavelengths $\lambda_1$ and $\lambda_2$.

Quantitative ranging with extended ambiguity length on the order of the synthetic wavelength can be accomplished through a combination of quadrature detection of the dual-wavelength interferogram values, and ratioing the resulting measured amplitude to that of a separate measurement with known (e.g., unity) envelope amplitude. The required quadrature measurements are (Eq. 13):

$$I_{12}^0 = 2A + 2B \cdot C_{12}(\Delta k_{12}, \Delta z)\cos(2\bar{k}_{12}\Delta z),$$

$$I_{12}^{90} = 2A + 2B \cdot C_{12}(\Delta k_{12}, \Delta z)\cos\left(2\bar{k}_{12}\Delta z + \frac{\pi}{2}\right) =$$
$$2A + 2B \cdot C_{12}(\Delta k_{12}, \Delta z)\sin(2\bar{k}_{12}\Delta z),$$

$$I_{12}^{180} = 2A + 2B \cdot C_{12}(\Delta k_{12}, \Delta z)\cos(2\bar{k}_{12}\Delta z + \pi) =$$
$$2A - 2B \cdot C_{12}(\Delta k_{12}, \Delta z)\cos(2\bar{k}_{12}\Delta z),$$

$$I_{12}^{270} = 2A + 2B \cdot C_{12}(\Delta k_{12}, \Delta z)\cos\left(2\bar{k}_{12}\Delta z + \frac{3\pi}{2}\right) =$$
$$2A - 2B \cdot C_{12}(\Delta k_{12}, \Delta z)\sin(2\bar{k}_{12}\Delta z).$$

Note that even though the synthetic wavelength envelope amplitude $C_{12}(\Delta k_{12}, \Delta z)$ is also a function of $\Delta z$, it is not necessary to include phase steps in $\Delta z$ in the above equations on the scale of $\pi/2$ at the mean wavenumber $\bar{k}_{12}$ inside the envelope amplitude expression in Eq. 13, since such phase steps are miniscule on the scale of the synthetic wavelength which characterizes the shape of $C_{12}(\Delta k_{12}, \Delta z)$. Also, since the quadrature measurement is being performed on the rapidly varying cosine as opposed to the synthetic wavelength envelope cosine, the phase of the envelope is not accessible. Thus, it is the magnitude of the envelope that is being measured. Notably, this approach represents a convenient way to measure the magnitude of the envelope of the slowly varying synthetic wavelength envelope utilizing much more convenient phase shifts on the order of the much shorter mean wavelength.

Combining these multiphase interferometric expressions, an expression is obtained which contains the magnitude of the synthetic wavelength envelope (Eq. 14):

$$2 \cdot |B| \cdot |C_{12}(\Delta k_{12}, \Delta z)| = \frac{\sqrt{(I_{12}^0 - I_{12}^{180})^2 + (I_{12}^{90} - I_{12}^{270})^2}}{2}.$$

To eliminate the remaining factor of B, note that for any one of the constituent measurements at a single wavelength $I_1$ or $I_2$, the visibility for a single wavelength interference measurement is unity since for $\Delta k_{11}=k_1-k_1=0$, $C_{11}(\Delta k_{11}, \Delta z)=\cos(2\cdot 0\cdot \Delta z)=1$. Thus, at either single wavelength, it is possible to make the same multi-phase measurement to obtain B (Eq. 15):

$$|B| = \frac{\sqrt{(I_1^0 - I_1^{180})^2 + (I_1^{90} - I_1^{270})^2}}{2} = \frac{\sqrt{(I_2^0 - I_2^{180})^2 + (I_2^{90} - I_2^{270})^2}}{2}.$$

Finally, it is possible to solve for the unknown path length difference $\Delta z$ by combining Eqs. 11, 14, and 15 as (Eqs. 16 and 17):

$$|C_{12}(\Delta k_{12}, \Delta z)| = |\cos(\Delta k_{12}\Delta z)| = \frac{\sqrt{(I_{12}^0 - I_{12}^{180})^2 + (I_{12}^{90} - I_{12}^{270})^2}}{2\cdot \sqrt{(I_1^0 - I_1^{180})^2 + (I_1^{90} - I_1^{270})^2}}.$$

$$\Delta z = \frac{1}{\Delta k_{12}}\arccos\left[\frac{\sqrt{(I_{12}^0 - I_{12}^{180})^2 + (I_{12}^{90} - I_{12}^{270})^2}}{2\cdot \sqrt{(I_1^0 - I_1^{180})^2 + (I_1^{90} - I_1^{270})^2}}\right].$$

Since with this measurement, only the magnitude (rather than the amplitude) of the synthetic wavelength envelope is obtained, the ambiguity length of the unknown pathlength difference is reduced by an additional factor of 4 corresponding to the first quarter of the synthetic wavelength envelope cosine corresponding to the principal value of Eq. 17 and is given as (Eq. 18):

$$\Delta z^{amb,magnitude} = \Lambda_{12}/4.$$

The preceding describes measurement of the synthetic wavelength magnitude $|C_{12}|$ over its extended ambiguity length $\Lambda_{12}/4$. The sensitivity of the measurement as a function of range will be proportional to the z derivative of $|C_{12}|$. Assuming $|C_{12}|$ is of the form $|C_{12}(\Delta k_{12},\Delta z)|=|\cos(\Delta k_{12}\Delta z)|$, the sensitivity will be of the form (Eq. 19):

$$\frac{d}{dz}|C_{12}(\Delta k_{12}, \Delta z)| \propto |\sin(\Delta k_{12}\Delta z)|,$$

which indicates that the sensitivity will be least near z=0, and greatest near $z=\Lambda_{12}/4$.

Figure 13:
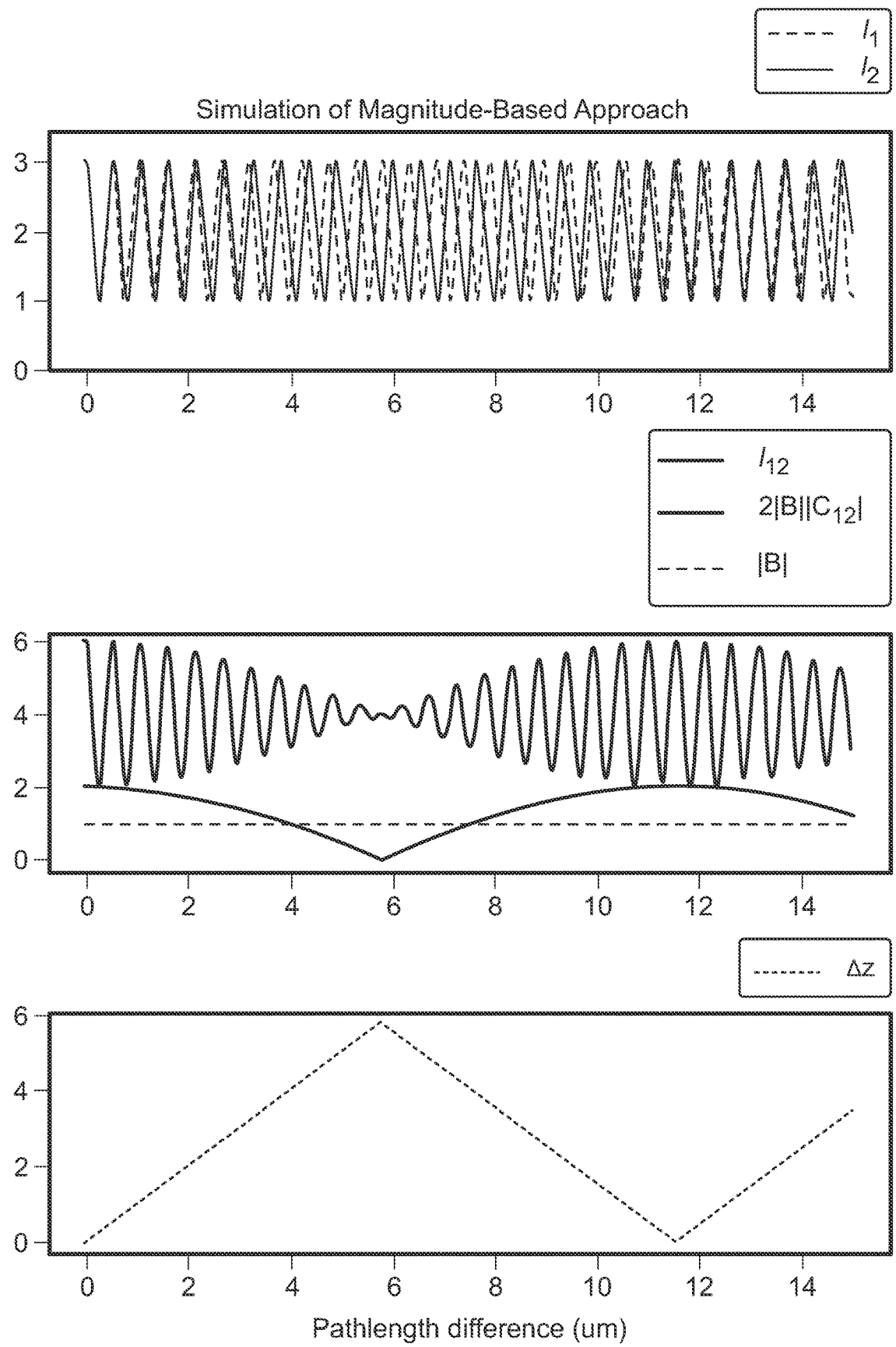
FIG. 13 illustrates a simulation of a magnitude-based quadrature detection approach.

FIG. 13 illustrates a simulation of a magnitude-based approach. Referring to FIG. 13, a simulation was carried out for A=2, B=1 at $\lambda_1=1.05$ µm, $\lambda_2=1.1$ µm, resulting in $\Lambda_{12}=23.1$ µm. The indicated parameters are representative of near-infrared light. Similar to the phase-based approach, this methodology works equally as well (i.e., the reconstruction of $\Delta z$ remains artifact-free) for arbitrary narrowing of the wavenumber separation, thus allowing for arbitrary extension of the ambiguity length.

Figure 14:
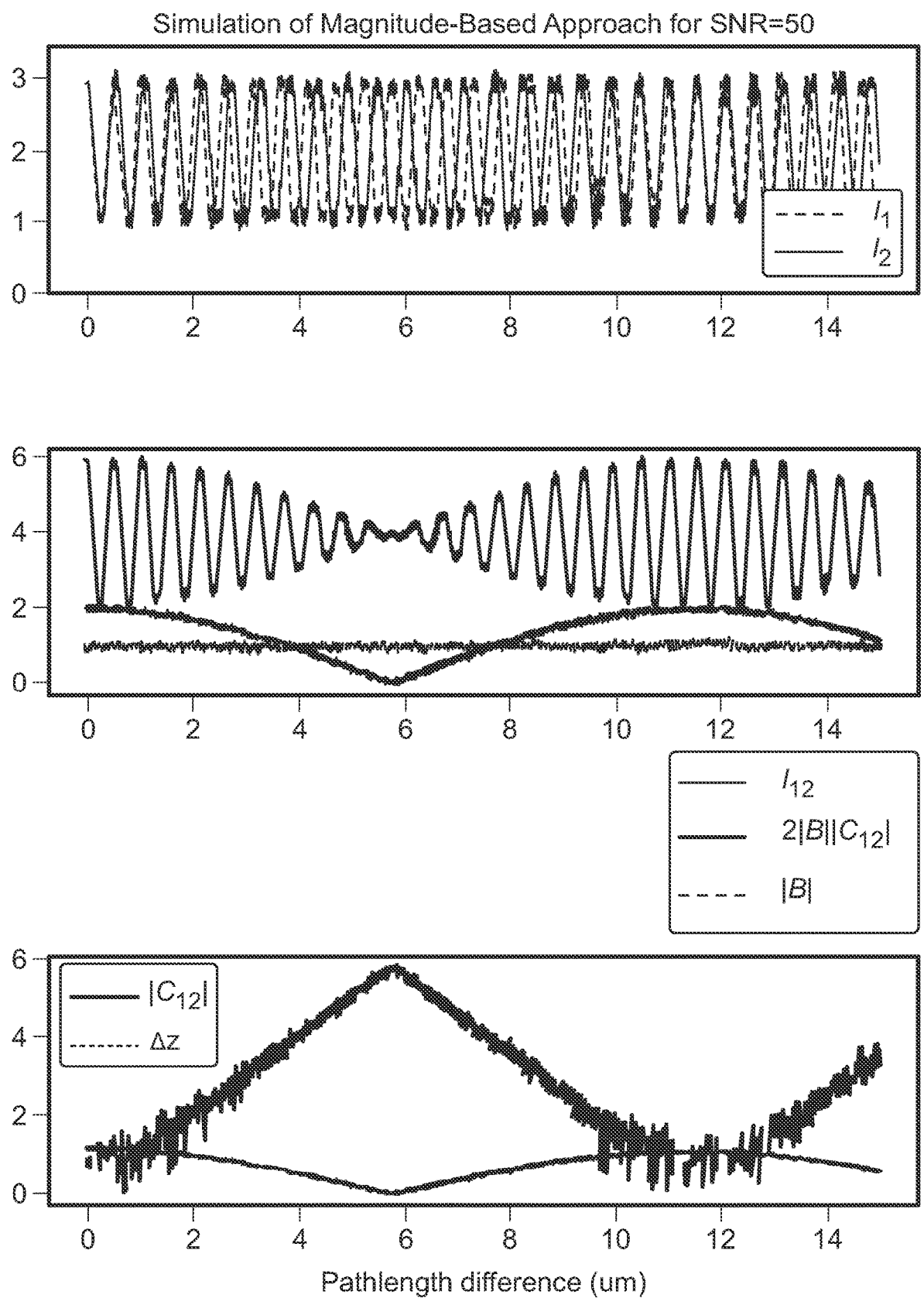
FIG. 14 illustrates the effect of the addition of approximately 1/50th of normally distributed Gaussian noise to each of the interferograms prior to pathlength difference computation in a simulation of a magnitude-based quadrature detection approach.

FIG. 14 illustrates the effect of the addition of approximately 1/50th of normally distributed Gaussian noise to each of the interferograms prior to pathlength difference computation in a simulation of a magnitude-based quadrature detection approach. Here, A=2, B=1 at $\lambda_1=1.05$ µm, $\lambda_2=1.1$ µm, resulting in $\Lambda_{12}=23.1$ µm, with Gaussian noise added to $I_1$ and $I_2$ such that SNR ~50. As predicted by Eq. 19, the sensitivity of this measurement in the presence of noise is least near z=0, and greatest near $z=\Lambda_{12}/4$. The results of adding noise following summation of the interferograms (i.e., simulating having both wavelengths illuminated simultaneously) are quite similar.

Envelope of Magnitude-Based Approach

Using quadrature detection for the magnitude-based approach has the advantage of very straightforward formulation as shown above, as well as supporting a straightforward hardware implementation. However, quadrature detection still requires phase stability for the required quadrature measurements at both wavelengths. To avoid this drawback, it would be desirable to detect the synthetic wavelength envelope shape $C_{12}(\Delta k_{12},\Delta z)$ in Eq. 10 directly, without requiring phase stability at the mean wavenumber $\bar{k}_{12}$. Fortunately, this can be achieved using methods of envelope detection which are well known in the art of electronics.

Direct detection of the envelope of the magnitude of the dual-wavelength interferogram again starts with incoherent summation of the detected intensities detected at the two wavelengths $\lambda_1$ and $\lambda_2$ (Eq. 9), however we assume the factor A (the DC component) has already been removed through balanced differential detection such as illustrated in FIGS. 3A and 3B:

$$I_{12} = 2B[\cos(2\bar{k}_{12}\Delta z)\cos(\Delta k_{12}\Delta z)].$$

As is well known from electronics (for example, a simple amplitude-modulated radio receiver), a common means for direct envelope detection consists of low-pass filtering of a rectified, modulated signal. Thus, in FIGS. 3A and 3B a means is provided for modulation of the interferometric pathlength difference $\Delta z$ by some additional distance $\delta$ which is assumed to be at least $\lambda_1$ or $\lambda_2$ (so that full-depth modulation is provided), but much smaller than the synthetic wavelength $\Lambda_{12}$ (so that the modulation will have negligible effect on the envelope magnitude). This modulation occurs at a frequency f which is within the bandwidth of the balanced detector, and only a few cycles of modulation of $\delta$ are required per integration time of each image pixel. Under these assumptions, the modulated dual-wavelength interferometric signal may be modeled as (Eq. 20):

$$\tilde{I}_{12} = 2B[\cos(2\bar{k}_{12}(\Delta z + \delta \cos 2\pi ft))\cos(\Delta k_{12}\Delta z)],$$

Here, the modulation is not included in the second cosine (corresponding to the synthetic wavelength envelope amplitude $C_{12}$ because the modulation distance is much smaller than the synthetic wavelength $\Lambda_{12}$. Envelope detection of the signal in Eq. 20 then proceeds straightforwardly: the signal is digitized over a few cycles of f, then rectified and low-pass filtered (LPF) at a cutoff frequency less then f (Eq. 21):

$$LPF[|\tilde{I}_{12}|] = \frac{B}{\sqrt{2}}\cos(\Delta k_{12}\Delta z) = \frac{B}{\sqrt{2}}C_{12}(\Delta k_{12}, \Delta z).$$

Similar to the wavelength ratioing approach described above for the quadrature-detected magnitude-based approach, the value of B may be obtained by simply repeating the same envelope detection procedure with only one of the two wavelengths $\lambda_1$ or $\lambda_2$ illuminated, since then (Eq. 22):

$$LPF[|\tilde{I}_1|] = LPF[|\tilde{I}_2|] = \frac{B}{\sqrt{2}}.$$

Finally, the unknown path length difference $\Delta z$ is obtained by combining Eqs. 21 and 22 as (Eq. 23):

$$\Delta z = \frac{1}{\Delta k_{12}} \arccos\left[\frac{LPF[|\tilde{I}_{12}|]}{LPF[|\tilde{I}_1|]}\right].$$

The described envelope of magnitude-based approach has a substantial advantage over both the quadrature detected phase and magnitude-based approaches of significantly relaxed temporal stability requirements, since small variations in the interferometric phase (due to object motion or wavelength instability, for example) will not substantially effect the described envelope measurement. In fact, the required phase modulation included in Eq. 20 need not be exactly cosinusoidal as described, or even purposefully executed using optical devices. In some cases, such as if there is already expected to be motion of the sample within some known frequency range (such as natural motion of the sample or unavoidable oscillations of the interferometer arms), that modulation alone may suffice for envelope detection. Additionally, the described method for low-pass filtering of the rectified, digitized signal is only one of many potential approaches which could be employed for direct detection of the dual-wavelength interferogram envelope $C_{12}(\Delta k_{12}, \Delta z)$. Other potential approaches could include modulation of both the pathlength difference $\Delta z$ and the detector gain in order to implement lock-in detection, or also various means which have been described for envelope detection in the optical (rather than electronic, post-digitization) domain.

Generalization of Magnitude-Based Approach for Non-Identical Visibility at Different Wavelengths The preceding section assumed that the visibility of the individual interferograms at wavelengths $\lambda_1$ and $\lambda_2$, or more specifically the interferometric coefficients for each of the wavelengths, A and B, are identical. For most situations this should be true for $\lambda_1$ and $\lambda_2$ separated by a small amount (e.g., a few nm or less), since the reflectivity of sample objects and transmissivity of interferometer components (fiber optics, beamsplitters, etc.) typically vary much more slowly with wavelength than that. However, some situations may arise for which this assumption is not true. In particular, for sample objects which contain multiple axially spaced reflectors, self-interference of sample arm light within the sample may fairly strongly modulate the overall sample reflectivity as a function of wavelength. In this situation, the assumption of identical interferometric coefficients may not hold, and the intensity $I_1$, $I_2$ and the incoherent summation $I_2$ can be given as (Eq. 24):

$$I_1 = A + B \cdot \cos(2k_1 \Delta z), I_2 = C + D \cdot \cos(2k_2 \Delta z),$$

$$I_{12} = I_1 + I_2 = A + B \cdot \cos(2k_1 \Delta z) + C + D \cdot \cos(2k_2 \Delta z).$$

The effect of allowing different visibility at different wavelengths is the reduction of the modulation of the synthetic wavelength interferogram.

Method of Successive Approximation for Increased Ranging Resolution

The previous sections describe methods for measurement of an unknown pathlength difference $\Delta z$ over an extended ambiguity length $\Delta z^{amb}$ characterized by the synthetic wavelength of dual-wavelength interferometer measurements ($\Lambda_{12}/2$ for the phase-based approach, and $\Lambda_{12}/4$ for the magnitude-based approaches). As illustrated in FIGS. 12 and 14, any real-world measurement which includes finite noise will add noise to the $\Delta z$ range measurement. For the phase-based approach with noise illustrated in FIG. 12 in particular, the SNR of the range measurement appears roughly similar to the SNR modeled for the component quadrature detection measurements (SNR=50 in that case, or few percent range accuracy). To get better range accuracy, one approach is to increase the SNR of the measurement, for example by increasing the optical power, collection efficiency, integration time, or averaging.

Another method to obtain a range measurement with increased range resolution is to multiplex multiple measurements of the pathlength difference obtained using different synthetic wavelengths. There are multiple ways to approach this, more generally formulated as an optimization problem. A very simple successive approximation approach is provided below as an illustration herein. This approach, while simple, achieves the remarkable goal of providing a measurement with n-bits of depth resolution using only n+1 synthetic wavelength measurements.

Figure 15:
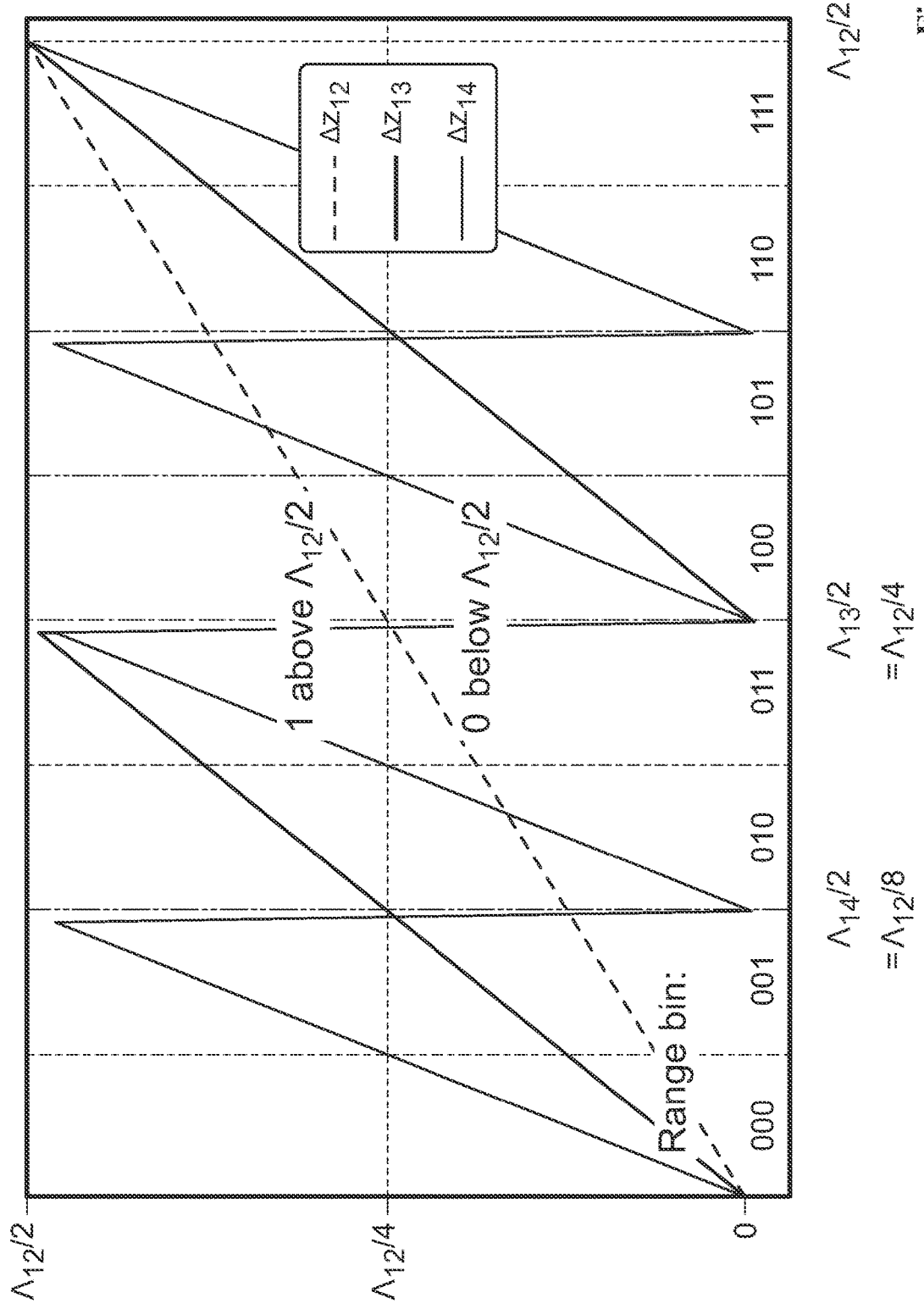
FIG. 15 shows a successive approximation of pathlength difference using multiple synthetic wavelengths using a phase-based approach.

Binary Successive Approximation for Phase-Based Synthetic Wavelength Measurement Approach A particularly simple method for multiplexing multiple synthetic wavelength measurements for increased range resolution which has similarities to the successive approximation approach used in analog/digital converters is illustrated in FIG. 15. FIG. 15 shows a successive approximation of pathlength difference using multiple synthetic wavelengths using a phase-based approach. Referring to FIG. 15, an illustration is shown of constructing n-bit binary word (in this case for n=3) encoding the range to a sample from n independent synthetic wavelength measurements. The goal is to derive an n-bit binary-encoded digital word $b=b_{12}b_{13}b_{14} \ldots b_{1n}$ which describes the distance to the reflector with n bits of resolution. To do this, a first measurement is made to obtain the pathlength difference $\Delta z_{12}$ using a pair of wavelengths $\lambda_1$, $\lambda_2$ with ambiguity length $z=\Lambda_{12}/2$ as described above. The first (most significant) bit $b_{12}$ of $b=b_{12}b_{13}b_{14} \ldots b_{1n}$ is set to 0 if $\Delta z_{12} < \Lambda_{12}/4$, and set to 1 if $\Delta z_{12} > \Lambda_{12}/4$. This encodes whether the sample is within the first half or second half of the first measurement's ambiguity length. Then a second measurement is made to obtain the pathlength difference $\Delta z_{13}$ at a pair of wavelengths $\lambda_1$, $\lambda_3$ which have twice the original wavelength separation, $\lambda_3 - \lambda_1 = 2(\lambda_2 - \lambda_1)$, so that this new measurement has ambiguity length $z=\Lambda_{13}/2=\Lambda_{12}/4$. This gives a second measurement with twice the range sensitivity, but half the ambiguity length. This new range information can be encoded as the second (next most significant) bit $b_{13}$ of $b=b_{12}b_{13}b_{14} \ldots b_{1n}$ by setting this bit to 0 if $\Delta z_{13} < \Lambda_{13}/4$, and to 1 if $\Delta z_{13} > \Lambda_{13}/4$. This process is then repeated n times, where n is the desired bit depth of the range measurement. For each successive bit $b_{1i}$, that bit is set to 0 if $\Delta z_{1i} < \Lambda_{1i}/4$, and set to 1 if $\Delta z_{1i} > \Lambda_{1i}/4$.

An issue can arise if any of the just described measurements $\Delta z_{12}$, $\Delta z_{13}$, $\ldots \Delta z_{1n}$ are equal to $\Lambda_{12}/2$ to within the measurement sensitivity. The simplest solution to this is simply to disregard that particular range measurement as unreliable, and move on to the next. However, more sophisticated solutions which incorporate principles of error coding from digital communications systems are also applicable.

Binary Successive Approximation for Magnitude-Based Synthetic Wavelength Measurement Approach The above method for multiplexing multiple synthetic wavelength measurements to increase range resolution is particularly straightforward since, according to Eqs. 5 and 7, the detected pathlength difference $\Delta z_{12}$ is linear over the full range of the ambiguity length $\Delta z_{12}^{amb}=\Lambda_{12}/2$. However, for the magnitude-based approach, as evident from Eqs. 16-18, since only the magnitude of the synthetic wavelength envelope $|C_{12}|$ is obtained, the ambiguity length $\Delta z^{amb,mag}=\Lambda_{12}/4$ is reduced by a factor of 4, corresponding to the first quarter of $|C_{12}(\Delta k_{12}, \Delta z)|=|\cos(\Delta k_{12}, \Delta z)|$. In this case, the successive approximation resolution improvement of the pathlength difference estimate $\Delta z$ can be described based on analysis of the synthetic wavelength envelope $|C_{12}|$ rather than the pathlength difference estimate $\Delta z$ directly, just to illustrate different ways to attack the problem.

Figure 16:
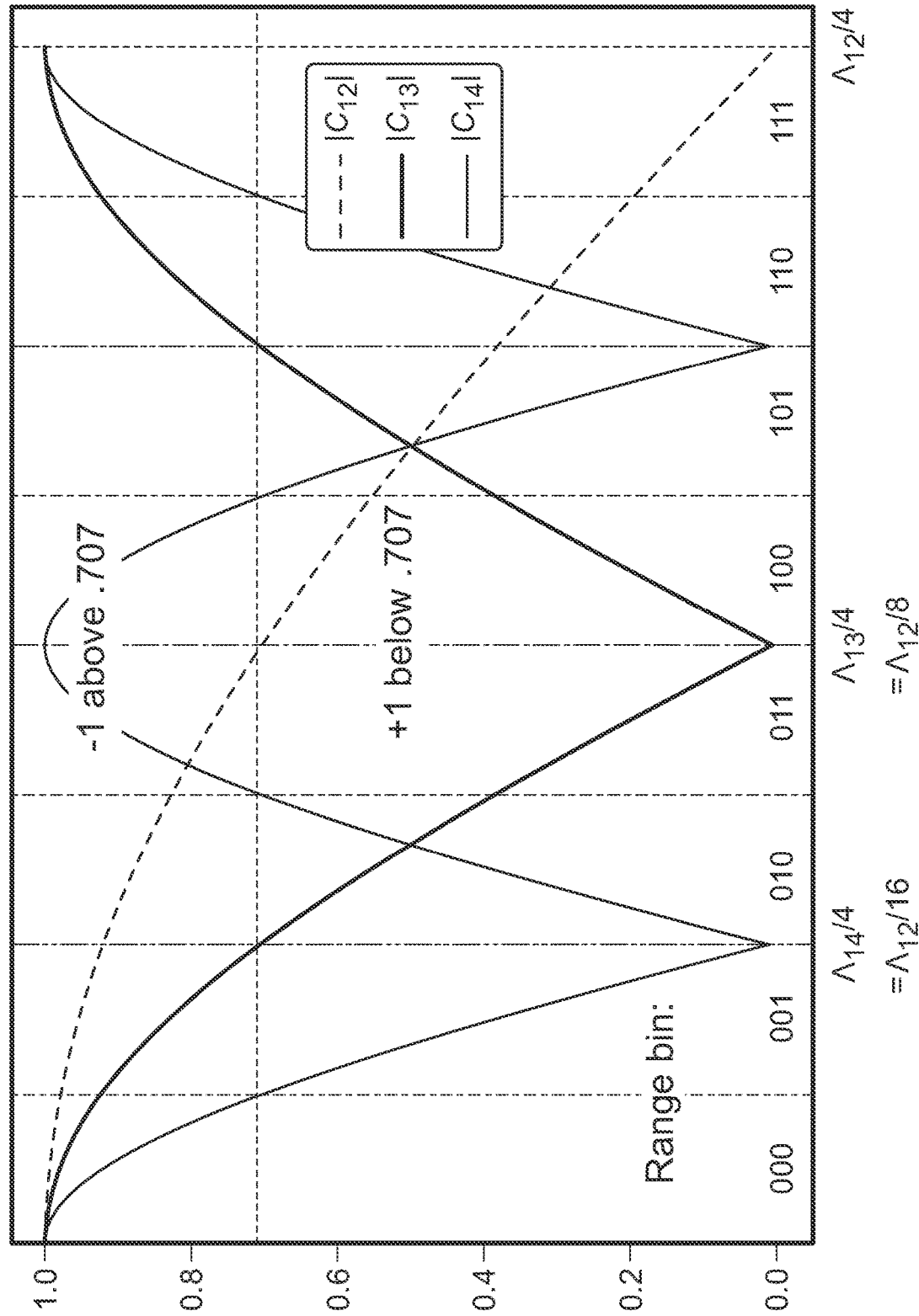
FIG. 16 shows a successive approximation of pathlength difference using multiple synthetic wavelengths using a magnitude-based approach.

FIG. 16 shows a successive approximation of pathlength difference using multiple synthetic wavelengths using the magnitude-based approach. Referring to FIG. 16, an illustration is shown of constructing n-bit binary word (in this case for n=3) encoding the range to a sample from n independent synthetic wavelength measurements with n factor of 2 wavelength separations.

Similar to that described above for the phase-based approach, a goal is to derive an n-bit binary-encoded digital word $b=b_{12}b_{13}b_{14}\ldots b_{1n}$ which describes the distance to the reflector with n bits of resolution. In the current case, a first measurement is made to obtain the synthetic wavelength magnitude $|C_{12}|$ at a pair of wavelengths $\lambda_1, \lambda_2$ with ambiguity length $z=\Lambda_{12}/4$ as described above. The first (most significant) bit $b_{12}$ of $b=b_{12}b_{13}b_{14}\ldots b_{1n}$ is set to 0 if $|C_{12}|>\cos(\pi/4)=0.707$, in which case the reflector position is less than $z=\Lambda_{12}/8$ and set to 1 if $|C_{12}|<\cos(\pi/4)=0.707$. This encodes whether the sample is within the first half or second half of the first measurement's ambiguity length. Also, a temporary variable $B_{12}$ is set to $-1$ if $|C_{12}|>0.707$, and $+1$ if $|C_{12}|<0.707$. Then a second measurement is made to obtain the synthetic wavelength magnitude $|C_{13}|$ at a pair of wavelengths $\lambda_1, \lambda_3$ which have twice the original wavelength separation, $\lambda_3-\lambda_1=2(\lambda_2-\lambda_1)$, so that this new measurement has ambiguity length $z=\Lambda_{13}/4=z=\Lambda_{12}/8$. Again, this gives a second measurement with twice the range sensitivity, but half the ambiguity length. This new range information can be encoded as the second bit $b_{13}$ of $b=b_{12}b_{13}b_{14}\ldots b_{1n}$ by setting this bit to 0 if $B_{12}\cdot|C_{13}|>0.707$ and to $+1$ if $B_{12}\cdot|C_{13}|<0.707$. Incorporation of the temporary variable $B_{12}$ accounts for the fact that $|C_{13}|$ reverses polarity beyond its ambiguity length. Also, another temporary variable $B_{13}$ is set to $-1$ if $|C_{13}|>0.707$, and $+1$ if $|C_{13}|<0.707$. This process is then repeated n times, where n is the desired bit depth of the range measurement. For each successive bit bin, that bit is set to 0 if $$B_{1(i-1)} \cdot |C_{1i}| > \cos(\pi/4) = 0.707 \text{ and to }+1 \text{ if}$$

$$B_{1(i-1)} \cdot |C_{1i}| < \cos(\pi/4) = 0.707, \text{ where } B_{1(i-1)} = B_{11} \cdot B_{12} \cdot B_{13} \cdot \ldots \cdot B_{1(i-1)}.$$

As mentioned above, an issue arises if any of the just described measurements $|C_{12}| |C_{13}| |C_{14}|\ldots |C_{1n}|$ are equal to 0.707 to within the measurement sensitivity. A simple solution to this issue is to disregard that particular range measurement as unreliable, and move on to the next. However, more sophisticated solutions which incorporate principles of error coding from digital communications systems are also possible.

Laser Eye Safety and Shot Noise Limits on Sample Reflectivity and Acquisition Time For a laser-based LIDAR system to be widely utilized, it must not pose an eye safety hazard to users or bystanders. The most popular wavelengths for LIDAR systems are currently $\lambda\sim900$ nm, and the principal optical communications wavelength region at $\lambda\sim1.5$ μm. Of these choices, $\lambda\sim1.5$ μm is much more eye safe, since the light is absorbed over much of the depth of the eye. Thus, the ANSI standard for maximum permissible exposure for cw light at $\lambda=1.5$ μm over long exposure times (i.e., 10 to 3×10³ seconds) is 9.6 mW, which is also the Class I laser classification limit (below which no special safety precautions need to be taken) for a $\lambda=1.5$ μm cw point laser source. The ANSI MPE for the same long exposure time for $\lambda=900$ nm is 0.61 mW, more than an order of magnitude less. Other approaches may be taken to mitigate the increased safety hazard at $\lambda\sim900$ nm, such as taking special precautions to regulate the beam divergence, exposure time, or viewing distance from such sources, however these are in general more difficult and costly than simply using a Class I$\lambda\sim1.5$ μm source. One current drawback of using $\lambda\sim1.5$ μm wavelength for LIDAR is that currently available detectors are InGaAs detectors, rather than the much more plentiful and inexpensive Si detectors usable below $\lambda\sim1000$ nm.

The signal-to-noise ratio expression for coherent LIDAR can be given as (Eq. 25)

$$SNR = \frac{\rho P_S R_S}{2eB} = \frac{\rho P_S R_S}{2e\left(\frac{1}{\Delta t}\right)}.$$

Here $\rho$ is the receiver responsivity, $P_S$ is the power incident on the sample, $R_S$ is the power reflectivity of the sample (including any non-idealities in the sample optical system light collection efficiency), e is the electronic charge, and B is the detection bandwidth (here approximated by the inverse of the acquisition time $\Delta t$).

The simulations provided FIGS. 12 and 14 for both phase- and magnitude-based approaches for coherent quadrature synthetic wavelength distance measurement illustrate that SNR≈50 appears sufficient for reliable depth measurement using these techniques. Thus, assuming that SNR>100 (to give a little extra margin), $\rho=0.5$ (typical for both InGaAs and Si optical receivers), $P_S=10$ mW (limited by the $\lambda\sim1.5$ μm MPE for eye exposure), and $e=1.6\times10^{-19}$ C, results in a simple relationship between the sample acquisition time and sample reflectivity (Eq. 26):

$$\Delta t > \frac{6.4 \cdot 10^{-15}}{R_S}.$$

This result indicates that at least for measurement at $\lambda\sim1.5$ μm, assuming shot-noise limited detection is achieved, that sample reflectivity even as low as 10-6 still allows sufficient SNR for reliable single-bit depth measurement time with ns-scale acquisition time, or 10-bit multiplexed depth measurements at >100M Hz. It should be noted that the NA available for LIDAR indicates that detection inefficiencies can restrict certain operations.

Phase Washout Limits on Acquisition Time and Rate

Performance of the phase-resolved measurements required for coherent quadrature detection using either the phase-based or magnitude-based approaches described above also places limits on the required acquisition time due to potential sample (or reference) motion during acquisition. The phenomenon of phase washout requires that $2k_0\Delta z$ remain small compared to $2\pi$ for the duration of the phase measurement (Eq. 27):

$$2k_0 \Delta z \ll 2\pi \approx 2\pi/10, \Delta z < \lambda_0/20.$$

The duration of the acquisition time is in turn limited by the allowable velocity of the sample, such that (Eq. 28):

$$v = \frac{\Delta z}{\Delta t} < \frac{\lambda_0/20}{\Delta t}, \Delta t < \frac{\lambda_0/20}{v\left(\frac{m}{s}\right)}, \frac{1}{\Delta t} > v\left(\frac{m}{s}\right) \times 20 \text{ MHz}.$$

As can be seen in the last expression of Eq. 28, the acquisition rate ($1/\Delta t$) assumes to $\lambda_0=1$ µm, which is well within the shot noise acquisition time limits imposed by laser safety considerations as explained in the previous section, even for highway automobile velocities (100 miles/hour≈40 m/s, so $1/\Delta t$=80 MHz) and a Class I laser at $\lambda_0$=1 µm. Currently, single-channel detectors can operate at sufficient speeds for capturing the information. For room-scale LIDAR with much more stable subjects (e.g., velocity~1 mm/s), then ($1/\Delta t$=20 kHz), which is definitely achievable using line-scan cameras (which can readily go up to 10× faster), and even fast area-scan cameras.

It should be understood that recitation of ranges of values herein are merely intended to serve as a shorthand method of referring individually to each separate value falling within the range, unless otherwise indicated herein, and each separate value is incorporated into the specification as if it were individually recited herein. For example, if a range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this disclosure.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method of rapid coherent synthetic wavelength interferometric absolute distance measurement, comprising:
   receiving, from an optical system, an image from an object scene of at least two distinct wavelengths of light, each wavelength's light source having a coherence length greater than a desired ambiguity length of the absolute distance measurement, and whose synthetic wavelength in combination provides the desired ambiguity length of the absolute distance measurement;
   determining either a phase or a magnitude of an interference signal for each wavelength of light measured individually or an envelope of a magnitude of a sum of the interference signal for both wavelengths measured together, for interference between light returning from the object scene and light traversing a separate reference arm path of the optical system; and
   calculating an optical distance to an object in the object scene from the phase or the magnitude of the interference signal for each wavelength of light measured individually or the envelope of the magnitude of the sum of the interference signal for both wavelengths measured together, the absolute distance measurement comprising the calculated optical distance to the object.

2. The method of claim 1, wherein the calculating of the optical distance is performed for each pixel of the image.

3. The method of claim 1, wherein the phase of the interference signal for each wavelength of light measured individually is determined,
   wherein the optical distance $\Delta z$ is given as:

$$\Delta z = \frac{\phi_1 - \phi_2}{2\Delta k_{12}} = \frac{\tan^{-1}\left[\frac{I_1^{90} - I_1^{270}}{I_1^0 - I_1^{180}}\right] - \tan^{-1}\left[\frac{I_2^{90} - I_2^{270}}{I_2^0 - I_2^{180}}\right]}{2\Delta k_{12}},$$

where $\phi_1$ is a first phase of the interferometric signal at a first wavelength of the at least two distinct wavelengths of light, $\phi_2$ is a second phase of the interferometric signal at a second wavelength of the at least two distinct wavelengths of light, where $I_n^0$, $I_n^{90}$, $I_n^{180}$, $I_n^{270}$, are detected intensities at each of four fixed $\pi/2$ radian separated phase steps detected at each of the at least two wavelengths of light, and $\Delta k_{12}=k_1-k_2$, where $k_n=2\pi/\lambda_n$, $\lambda_n$ is a particular wavelength of light of the at least two distinct wavelengths of light, and n is an index representing the at least two distinct wavelengths of light.

4. The method of claim 1, wherein the phase of the interference signal for each wavelength of light measured individually is determined,
   wherein the optical distance $\Delta z$ is given as:

$$\Delta z = \frac{\phi_1 - \phi_2}{2\Delta k_{12}} = \frac{\tan^{-1}\left[\frac{I_1^{90-180} - I_1^{270-360}}{I_1^{0-90} - I_1^{180-270}}\right] - \tan^{-1}\left[\frac{I_2^{90-180} - I_2^{270-360}}{I_2^{0-90} - I_2^{180-270}}\right]}{2\Delta k_{12}},$$

where $\phi_1$ is a first phase of the interferometric signal at a first wavelength of the at least two distinct wavelengths of light, $\phi_2$ is a second phase of a the interferometric signal at a second wavelength of the at least two distinct wavelengths of light, where $$I_n^{0-90}, I_n^{90-180}, I_n^{180-270}, I_n^{270-360}$$

are detected intensities at each of four $\pi/2$ radian separated swept phases detected at each of the at least two wavelengths of light, and $\Delta k_{12} = k_1 - k_2$, where $k_n = 2\pi/\lambda_n$, $\lambda_n$ is a particular wavelength of light of the at least two distinct wavelengths of light, and n is an index representing the at least two distinct wavelengths of light.

5. The method of claim 1, wherein the magnitude of the interference signal for each wavelength of light measured individually is determined, wherein the optical distance $\Delta z$ is given as:

$$\Delta z = \frac{1}{\Delta k_{12}} \arccos\left[\frac{\sqrt{(I_{12}^0 - I_{12}^{180})^2 + (I_{12}^{90} - I_{12}^{270})^2}}{2 \cdot \sqrt{(I_1^0 - I_1^{180})^2 + (I_1^{90} - I_1^{270})^2}}\right],$$

where $I_{12}^0$, $I_{22}^{90}$, $I_{12}^{180}$, and $I_{12}^{270}$ are detected summed intensities at each of four fixed $\pi/2$ radian separated phase steps of the interferometric signal at the two distinct wavelengths, $I_1^0$, $I_1^{90}$, $I_1^{180}$, and $I_1^{270}$ are the detected intensities at each of four fixed $\pi/2$ radian separated phase steps for a first wavelength of the at least two distinct wavelengths of light, and $\Delta k_{12} = k_1 - k_2$, where $k_n = 2\pi/\lambda_n$, $\lambda_n$ is a particular wavelength of light of the at least two distinct wavelengths of light, and n is an index representing the at least two distinct wavelengths of light.

6. The method of claim 1, wherein the magnitude of the interference signal for each wavelength of light measured individually is determined, wherein the optical distance $\Delta z$ is given as:

$$\Delta z = \frac{1}{\Delta k_{12}} \arccos\left[\frac{\sqrt{(I_{12}^{0-90} - I_{12}^{180-270})^2 + (I_{12}^{90-180} - I_{12}^{270-360})^2}}{2 \cdot \sqrt{(I_1^{0-90} - I_1^{180-270})^2 + (I_1^{90-180} - I_1^{270-360})^2}}\right],$$

where $I_{12}^{0-90}$, $I_{12}^{90-180}$, $I_{12}^{180-270}$, and $I_{12}^{270-360}$ are detected summed intensities at each of four $\pi/2$ radian separated swept phases of the interferometric signal at the two distinct wavelengths, $I_1^{0-90}$, $I_1^{90-180}$, $I_1^{180-270}$ and $I_1^{270-360}$ are the detected intensities at each of four $\pi/2$ radian separated swept phases for a first wavelength of the at least two distinct wavelengths of light, and $\Delta k_{12} = k_1 - k_2$, where $k_n = 2\pi/\lambda_n$, $\lambda_n$ is a particular wavelength of light of the at least two distinct wavelengths of light, and n is an index representing the at least two distinct wavelengths of light.

7. The method of claim 1, wherein the envelope of the magnitude of the sum of the interference signal for both wavelengths measured together is determined, wherein the optical distance $\Delta z$ is given as:

$$\Delta z = \frac{1}{\Delta k_{12}} \arccos\left[\frac{LPF[|\tilde{I}_{12}|]}{LPF[|\tilde{I}_1|]}\right],$$

where $\tilde{I}_{12}$ is a modulated dual-wavelength interferometric signal digitized over a few cycles of a frequency, rectified, and low-pass filtered (LPF) at a cutoff frequency less than the frequency, $\tilde{I}_1$ is a modulated single-wavelength interferometric signal digitized over a few cycles of the frequency, rectified, and low-pass filtered (LPF) at the cutoff frequency less than the frequency, and $\Delta k_{12} = k_1 - k_2$, where $k_n = 2\pi/\lambda_n$, $\lambda_n$ is a particular wavelength of light of the at least two distinct wavelengths of light, and n is an index representing the at least two distinct wavelengths of light.

8. The method of claim 1, wherein the receiving, determining, and calculating are repeatedly performed with two or more additional wavelengths whose synthetic wavelength in combination provides a higher resolution distance measurement than a previous measurement.

9. The method of claim 8, further comprising performing a binary successive approximation to combine all of the distance measurements generated by the repeatedly performed receiving, determining, and calculating.

10. The method of claim 1, wherein the optical system is an optical circulator-based non-quadrature detection optical system, an optical hybrid-based optical system, a polarization encoding-based optical system, or an off-axis holographic-based optical system.

11. A system for rapid coherent synthetic wavelength interferometric absolute distance measurement, comprising:
an optical system;
a controller; and
a computing device, wherein the computing device is configured to:
receive, from the optical system, an image from an object scene of at least two distinct wavelengths of light, each wavelength's light source having a coherence length greater than a desired ambiguity length of the absolute distance measurement, and whose synthetic wavelength in combination provides the desired ambiguity length of the absolute distance measurement;
determine either a phase or a magnitude of an interference signal for each wavelength of light measured individually or an envelope of a magnitude of a sum of the interference signal for both wavelengths measured together, for interference between light returning from the object scene and light traversing a separate reference arm path of the optical system; and
calculate an optical distance to an object in the object scene from the phase or the magnitude of the interference signal for each wavelength of light measured individually or the envelope of the magnitude of the sum of the interference signal for both wavelengths measured together, the absolute distance measurement comprising the calculated optical distance to the object.

12. The system of claim 11, wherein the controller directs the optical system to perform a phase stepping approach.

13. The system of claim 11, wherein the controller directs the optical system to perform a phase sweeping approach.

14. The system of claim 11, wherein the controller directs the optical system to illuminate both wavelengths of at least two distinct wavelengths of light simultaneously and to measure interference separately using wavelength selective filtering or differential modulation.

15. The system of claim 11, wherein the controller directs the optical system to illuminate each wavelength of the at least two distinct wavelengths of light separately and to measure phase values sequentially.

16. The system of claim 11, wherein the controller directs the optical system for phase sweeping coherent quadrature detection.

17. The system of claim 16, wherein the controller directs the optical system for the phase sweeping coherent quadrature detection using a continuously moving piezoelectric actuator.

18. The system of claim 16, wherein the controller directs the optical system for the phase sweeping coherent quadrature detection using off-axis holography.

19. The system of claim 11, wherein the optical system is a polarization encoding-based optical system.

20. The system of claim 11, wherein the optical system is an off-axis holographic-based optical system.

* * * * *